(12) United States Patent
Ramasubramonian et al.

(10) Patent No.: US 12,002,244 B2
(45) Date of Patent: Jun. 4, 2024

(54) GLOBAL SCALING FOR GEOMETRY-BASED POINT CLOUD CODING

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, Del Mar, CA (US); Louis Joseph Kerofsky, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 17/224,984

(22) Filed: Apr. 7, 2021

(65) Prior Publication Data

US 2021/0327097 A1     Oct. 21, 2021

Related U.S. Application Data

(60) Provisional application No. 63/041,668, filed on Jun. 19, 2020, provisional application No. 63/013,934,
(Continued)

(51) Int. Cl.
*G06T 9/00* (2006.01)
*G06T 3/40* (2006.01)
*G06T 9/40* (2006.01)

(52) U.S. Cl.
CPC .............. *G06T 9/001* (2013.01); *G06T 3/40* (2013.01); *G06T 9/40* (2013.01)

(58) Field of Classification Search
CPC .. G06T 9/001; G06T 3/40; G06T 9/40; H04N 19/172; H04N 19/174; H04N 19/90;
(Continued)

(56) References Cited

U.S. PATENT DOCUMENTS

2019/0087978 A1* 3/2019 Tourapis ................... G06T 3/08
2019/0087979 A1* 3/2019 Mammou ............ H04N 19/597

OTHER PUBLICATIONS

Ramasubramonian (Qualcomm) A.K., et al., "[G-PCC] Normative Bounding Box and Global Scaling for Point Clouds", 131. MPEG Meeting, 20200629-20200703, Online, (Motion Picture Expert Group or ISO/IEC JTC1/SC29/WG11) No. m54584, Jul. 1, 2020 (Jul. 1, 2020), XP030289058, 23 Pages, Retrieved from the Internet: URL: http://phenix.int-evry.fr/mpeg/doc_end_user/documents/131_OnLine/wg11/m54584-v3-m54584-v3.zip. m54584-v2.pdf [retrieved on Jul. 1, 2020].
(Continued)

*Primary Examiner* — Neil R McLean
(74) *Attorney, Agent, or Firm* — Shumaker & Sieffert, PA

(57) ABSTRACT

An example device for decoding point cloud data includes: a memory configured to store point cloud data; and one or more processors implemented in circuitry and configured to: decode a frame of the point cloud data including a plurality of points, each of the points being associated with position values defining a respective position of the point; determine a global scaling factor for the frame; and scale the position values of each of the points by the global scaling factor. The scaling may be clipped to prevent the points exceeding the boundaries of a corresponding bounding box including respective points.

20 Claims, 6 Drawing Sheets

Related U.S. Application Data filed on Apr. 22, 2020, provisional application No. 63/010,546, filed on Apr. 15, 2020, provisional application No. 63/007,288, filed on Apr. 8, 2020.

(58) Field of Classification Search
CPC .... H04N 19/70; H04N 19/597; H04N 19/124; H04N 19/96
USPC .......................................................... 382/100
See application file for complete search history.

(56) References Cited

OTHER PUBLICATIONS

Ramasubramonian (Qualcomm) A.K., "[G-PCC] [New proposal] Global Scaling for Point Clouds", 130, MPEG Meeting, 20200420-20200424, Alpbach, (Motion Picture Expert Group or ISO/IEC JTC1/SC29/WG11) No. m53650, Apr. 15, 2020 (Apr. 15, 2020), XP030287310, 8 Pages, Retrieved from the Internet: URL: http:/phenix.int-evry.fr/mpeg/doc_end_user/documents/130_Alpbach/wg11/m53650-v1-m53650.zip. m53650.docx [retrieved on Apr. 15, 2020].

Ramasubramonian A.K., (Qualcomm) et al., "[G-PCC] Normative Bounding Box and Global Scaling for Point Clouds". 131. MPEG Meeting, 20200629-20200703, Online, (Motion Picture Expert Group or ISO/IEC JTC1/SC29/WG11) No. m54584, Jun. 20, 2020, XP030289056, 16 Pages.

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

Graziosi D., et al., "An Overview of Ongoing Point Cloud Compression Standardization Activities: Video-Based (V-PCC) and Geometry-Based(G-PCC)", Industrial Technology Advances, SIP, vol. 9, No. e13, Apr. 2020, pp. 1-17.

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 102 pages.

International Search Report and Written Opinion—PCT/US2021/026422—ISA/EPO—dated Jul. 2, 2021, 14 pp.

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

"Text of ISO/IEC CD 23090-9 Geometry-Based Point Cloud Compression", 126. MPEG Meeting, 20190325-20190329, Geneva, (Motion Picture Expert Group or ISO/IEC JTC1/SC29/WG11), No. n18478, Jul. 2, 2019 (Jul. 2, 2019), XP030222353, 102 Pages, Retrieved from the Internet: URL:http://phenix.int-evry.fr/mpeg/doc_end_user/documents/126_Geneva/wg11/w18478.zip w18478 GPCC_CD.docx [retrieved on Jul. 2, 2019].

\* cited by examiner

GLOBAL SCALING FOR GEOMETRY-BASED POINT CLOUD CODING

This application claims the benefit of U.S. Provisional Application No. 63/007,288, filed Apr. 8, 2020, U.S. Provisional Application No. 63/010,546, filed Apr. 15, 2020, U.S. Provisional Application No. 63/013,934, filed Apr. 22, 2020, and U.S. Provisional Application No. 63/041,668, filed Jun. 19, 2020, the entire contents of each of which are hereby incorporated by reference.

TECHNICAL FIELD

This disclosure relates to point cloud encoding and decoding.

SUMMARY

In general, this disclosure describes techniques for improving quantization and scaling of point cloud data. The techniques of this disclosure may be used in conjunction with any techniques for compressing (e.g., encoding and decoding) point cloud data, including geometry-based point cloud compression (G-PCC) techniques. In particular, points of a frame may be globally scaled. That is, all points of the frame may be scaled in the same manner. Scaling, whether global or local, may be performed in a manner that avoids causing positions for points from exceeding their corresponding bounding box.

In one example, a method of decoding point cloud data includes decoding a frame of point cloud data including a plurality of points, each of the points being associated with position values defining a respective position of the point; determining a global scaling factor for the frame; and scaling the position values of each of the points by the global scaling factor.

In another example, a device for decoding point cloud data includes a memory configured to store point cloud data; and one or more processors implemented in circuitry and configured to: decode a frame of the point cloud data including a plurality of points, each of the points being associated with position values defining a respective position of the point; determine a global scaling factor for the frame; and scale the position values of each of the points by the global scaling factor.

In another example, a computer-readable storage medium has stored thereon instructions that, when executed, cause a processor to: decode a frame of point cloud data including a plurality of points, each of the points being associated with position values defining a respective position of the point; determine a global scaling factor for the frame; and scale the position values of each of the points by the global scaling factor.

In another example, a device for decoding point cloud data, the device comprising: means for decoding a frame of point cloud data including a plurality of points, each of the points being associated with position values defining a respective position of the point; determining a global scaling factor for the frame; and scaling the position values of each of the points by the global scaling factor.

In another example, a method of encoding point cloud data includes encoding a frame of point cloud data including a plurality of points, each of the points being associated with position values defining a respective position of the point; determining an initial global scaling factor for the frame; determining a number of bits used to specify a refinement value to be applied to the initial global scaling factor; determining a scale factor refinement value having the number of bits; and generating a bitstream including data representing the encoded frame, the number of bits used to specify the refinement value, and the scale factor refinement value.

The details of one or more examples are set forth in the accompanying drawings and the description below. Other features, objects, and advantages will be apparent from the description, drawings, and claims.

DETAILED DESCRIPTION

Figure 1:
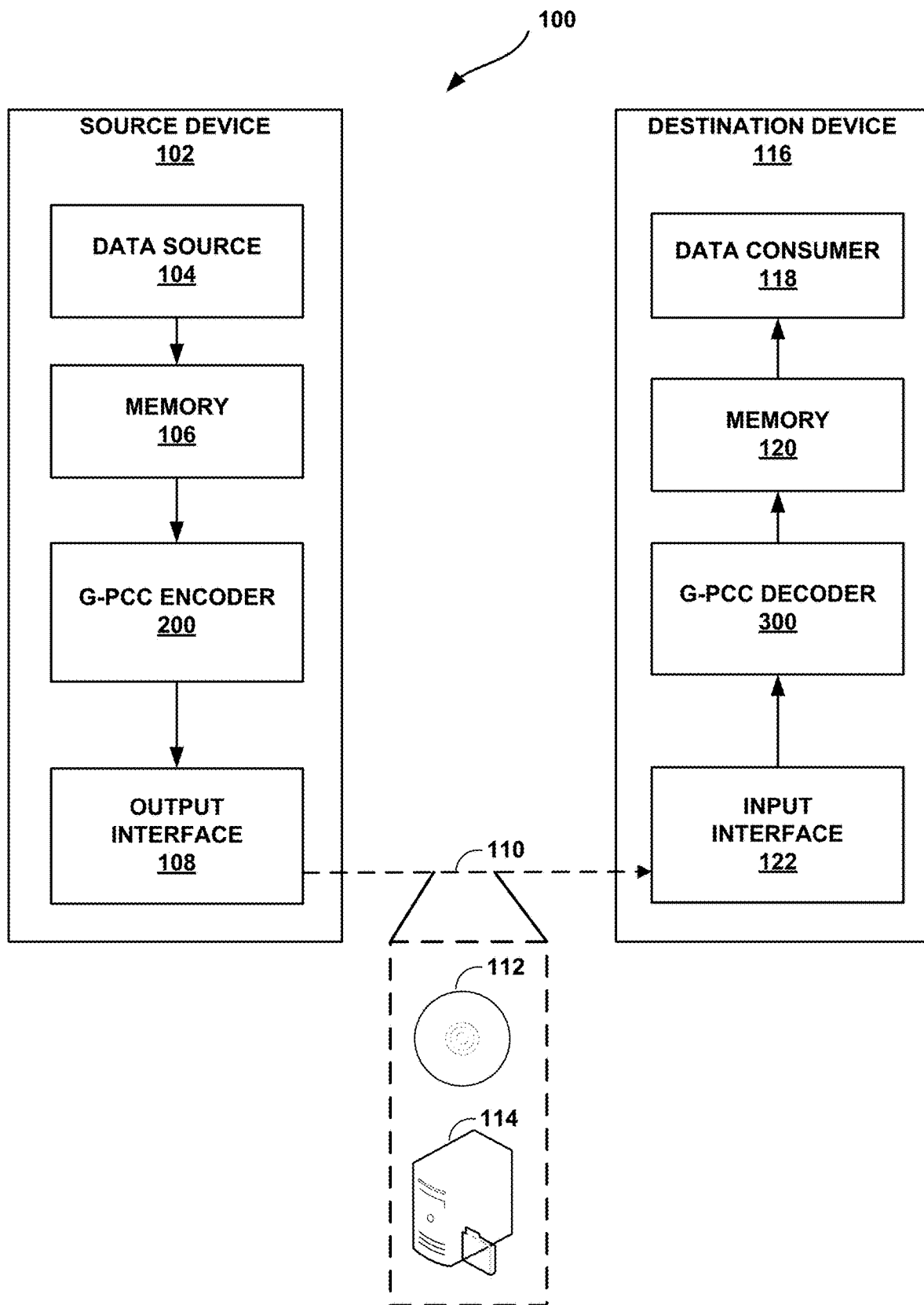
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to: (1) determining whether a scaled point cloud is in violation of a sequence parameter set (SPS) boundary box constraint; (2) determining a global scaling factor of a point cloud using a normative scaling syntax element; (3) determining a scale power value based on a syntax element or one or more QP values; and/or (4) determining a bounding box within a SPS boundary box. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to: (1) determining whether a scaled point cloud is in violation of a sequence parameter set (SPS) boundary box constraint; (2) determining a global scaling factor of a point cloud using a normative scaling syntax element; (3) determining a scale power value based on a syntax element or one or more QP values; and/or (4) determining a bounding box within a SPS boundary box. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
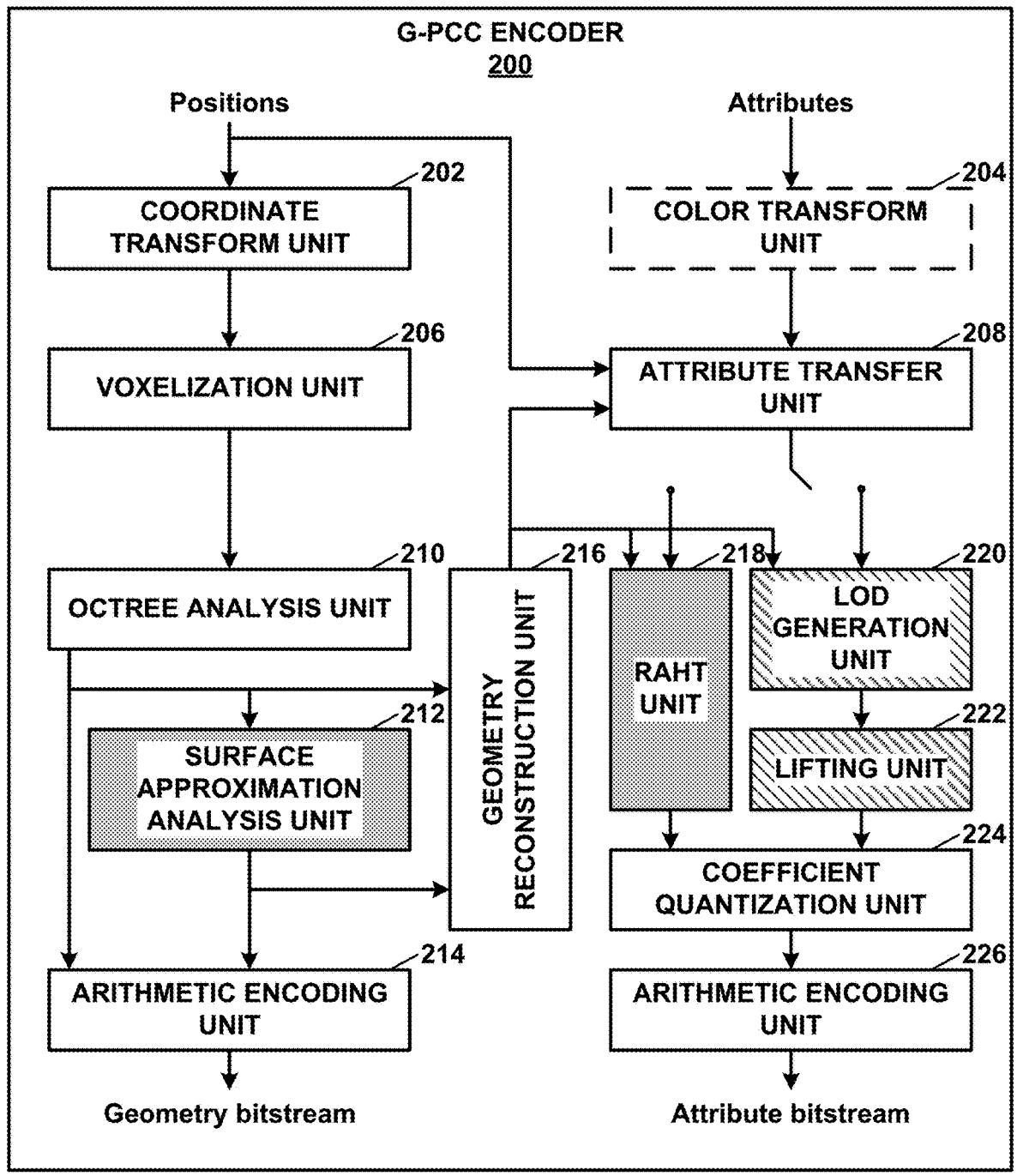
FIG. 2 is a block diagram illustrating an example Geometry Point Cloud Compression (G-PCC) encoder.
Figure 3:
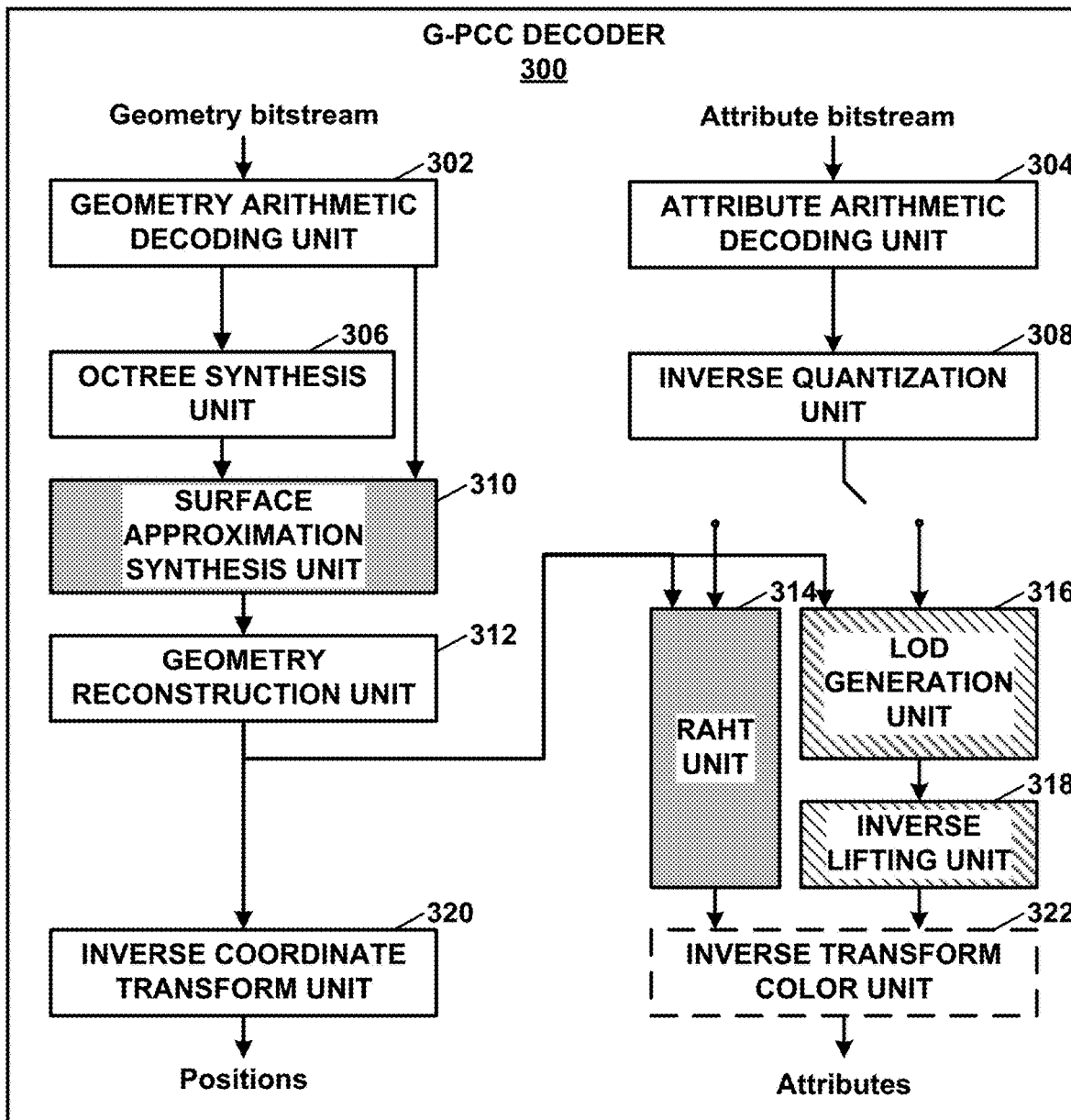
FIG. 3 is a block diagram illustrating an example G-PCC decoder.

FIG. 2 is a block diagram illustrating an example set of components of G-PCC encoder 200. FIG. 3 is a block diagram illustrating an example set of components of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

According to the techniques of this disclosure, voxelization unit 206 may determine a global quantization factor that may be applied to position values for all points in a frame of geometry-based point cloud data. In some examples, G-PCC encoder 200 may explicitly signal data representative of the global quantization factor (which may also be referred to as a global scaling factor, in that G-PCC decoder 300 may perform scaling using this factor). In some examples, position values for the points may be expressed at a first, high bit depth, and voxelization unit 206 may quantize the position values for the points to a second, lower bit depth. In some examples, G-PCC encoder 200 may encode data representing the second bit depth.

Voxelization unit 206 may quantize position values for points of the frame of geometry-based point cloud data using a quantization (or scaling) factor having two parts: a first portion that is a power of two and a second portion that acts as a refinement value. The refinement value may have a certain number of bits, and thus, a certain number of divisions between power of two values. Likewise, G-PCC encoder 200 may encode data representing the number of bits for the refinement value. As an example, if there are two bits for the refinement value, the refinement value may be one of 0, 1, 2, or 3, and the intervals between powers of 2 may be divided into fourths. The table below represents an example of quantization/scaling factors and corresponding powers of two and refinement values:

| Quantization/ scaling factor | Power of two value | Refinement value |
| --- | --- | --- |
| 1 | 0 ($2^0 = 1$) | 0 ((2 − 1)/4 * 0 = 0) |
| 1.25 | 0 ($2^0 = 1$) | 1 ((2 − 1)/4 * 1 = .25) |
| 1.5 | 0 ($2^0 = 1$) | 2 ((2 − 1)/4 * 2 = .5) |
| 1.75 | 0 ($2^0 = 1$) | 3 ((2 − 1)/4 * 3 = .75) |
| 2 | 0 ($2^1 = 2$) | 0 ((4 − 2)/4 * 0 = 0) |
| 2.5 | 0 ($2^1 = 2$) | 1 ((4 − 2)/4 * 1 = .5) |
| 3 | 0 ($2^1 = 2$) | 2 ((4 − 2)/4 * 2 = 1) |
| 3.5 | 0 ($2^1 = 2$) | 3 ((4 − 2)/4 * 3 = 1.5) |
| 4 | 0 ($2^2 = 4$) | 0 ((8 − 4)/4 * 0 = 0) |
| 5 | 0 ($2^2 = 4$) | 1 ((8 − 4)/4 * 1 = 1) |
| 6 | 0 ($2^2 = 4$) | 2 ((8 − 4)/4 * 2 = 2) |
| 7 | 0 ($2^2 = 4$) | 3 ((8 − 4)/4 * 3 = 3) |
| ... | ... | ... |
| $2^N + \left(\frac{2^{N+1} - 2^N}{4}\right) * R$ | N | $R \in [0, 3]$ |

Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively, or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 includes a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

In accordance with the techniques of this disclosure, geometry reconstruction unit 312 may scale position values of points in a frame of geometry-based point cloud data by a scaling factor. In some examples, geometry reconstruction unit 312 may scale the position values in a manner that avoids exceeding the boundaries of a corresponding bounding box. For example, if the scaling would cause one of the position values to exceed the boundaries of the corresponding bounding box, geometry reconstruction unit 312 may clip the one of the position values to instead be within the boundaries of the corresponding bounding box.

In some examples, geometry reconstruction unit 312 may decode a global scaling factor for a frame of geometry-based point cloud data. The global scaling factor may have two components: a power of two component and a refinement component.

Geometry reconstruction unit 312 may calculate the global scaling factor to be used to scale position values for all points of the frame of geometry-based point cloud data using the power of two component and the refinement component. In general, conceptually, geometry reconstruction unit 312 may decode N as an exponent to be applied to calculate the power of two factor ($2^N$), divide a range between $2^N$ and $2^N+1$ by a number of possible refinement values, multiply the refinement value R (having B bits) by the value resulting from the division $$\left(\left(\frac{2^{N+1} - 2^N}{2^B}\right) * R\right),$$

and concatenating the result with the power of two factor. As discussed above, geometry reconstruction unit 312 may achieve this calculation according to the following pseudocode:

GlobalScaleBase=1<<global_scale_refinement_num_bits
GlobalScaleShift=global_scale_refinement_num_bits
GlobalScaleOffset=GlobalScaleShift ? 1<<(GlobalScaleShift−1): 0
GlobalScale=(GlobalScaleBase+global_scale_refinement_factor)<<global_scale_factor_log 2

In particular, as discussed above, G-PCC decoder 300 may decode a logarithmic value portion of a global scale factor (e.g., global_scale_factor log 2), a value representing a number of refinement bits (e.g., global_scale_refinement_num_bits), and a global scale refinement value (e.g., global_scale_factor_refinement). G-PCC decoder 300 may decode these values from a sequence parameter set. Geometry reconstruction unit 312 may then apply these values in the pseudocode above to calculate the global scale factor.

Ultimately, geometry reconstruction unit 312 may then globally scale the position values of the points as discussed above using the global scale factor.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

A G-PCC coder (e.g., G-PCC encoder 200 or G-PCC decoder 300) may represent the original point cloud in a floating point format or at a very high bit depth. The G-PCC coder may quantize the input point cloud and voxelize the quantized input point cloud at a certain bit depth, denoted by voxelization unit 206 of FIG. 2 and inverse quantization unit 308 of FIG. 3, then Quantize and remove points (Voxelize) block in the G-PCC block diagram (e.g., see FIG. 2). The G-PCC encoder 200 may apply a quantization at the encoder in this block for the purpose of voxelization, and a scaling may be performed at the decoder side mainly for the mapping of the decoded point cloud (i.e., in voxels unit) in application specific physical space (i.e., in physical dimension). A scale value that may be used by the decoder for this operation is signaled using the syntax elements sps_source_scale_factor_numerator_minus1 and sps_source_scale_factor_denominator_minus1. The quantization process being a pre-processing step (e.g., prior to encoding) and the scaling process being a post-processing step (e.g., after decoding) does not impact the overall coding process, e.g., they are non-normative in nature.

| | |
|---|---|
| sps_source_scale_factor_numerator_minus1 | ue(v) |
| sps_source_scale_factor_denominator_minus1 | ue(v) |

For purposes of this disclosure at the encoder side (e.g., G-PCC encoder 200), the point cloud before the non-normative quantization may be referred to as unquantized point cloud and the point cloud after the non-normative quantization may be referred to as the quantized point cloud; this quantization is not related to the quantization that may be done by a G-PCC codec. Similarly, the output of G-PCC decoder 300 is referred to as the quantized point cloud; the output of any non-normative scaling at the decoder-side is referred to as unquantized point cloud. The output of G-PCC decoder 300 may be the result of normative scaling operations.

Similar to the notion of picture width and height in images and video, point clouds may have a notion of bounding box whereby all the points in a point cloud are considered to be present within a bounding box. In other words, a bounding box may be defined such that the bounding box includes or contains all the points in the point cloud.

At the time of capture or generation of a point cloud, a bounding box may be specified to capture all the points. This bounding box may be referred to as the source bounding box. In G-PCC, a SPS bounding box is specified that may be indicating of the source bounding box. For the purpose of this disclosure, the SPS bounding box may be referred to as the source bounding box. The units of describing the source bounding box are not defined in G-PCC and it is left for the application to determine these units. The syntax and semantics associated with the SPS bounding box are provided below.

It is presumed (because this behavior is not defined in the G-PCC specification) that the output of G-PCC decoder 300 may be scaled using the source scale factor (derived from sps_source_scale_factor_numerator_minus1 and sps_source_scale_factor_denominator_minus1) and the output of this (non-normative) scaling is contained within the SPS bounding box.

The following table represents an example sequence parameter set (SPS) including example source bounding box syntax elements:

| | Descriptor |
|---|---|
| seq_parameter_set( ) { | |
|   main_profile_compatibility_flag | u(1) |
|   reserved_profile_compatibility_2bits | u(22) |
| [Ed. assign bits from this when there is a profile defined] | |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
|     sps_bounding_box_size_width | ue(v) |
|     sps_bounding_box_size_height | ue(v) |
|     sps_bounding_box_size_depth | ue(v) |
|   } | |
|   sps_source_scale_factor_numerator_minus1 | ue(v) |
|   sps_source_scale_factor_denominator_minus1 | ue(v) |
|   sps_num_attribute_sets | ue(v) |
|   for( i = 0; i< sps_num_attribute_sets; i++ ) { | |

Semantics for certain syntax elements of the example source bounding box syntax in the example SPS above may be defined as follows:

main_profile_compatibility_23bitsflag equal to 1 specifies that the bitstream conforms to the Main profile. main_profile_compatibility_flag equal to 0 specifies that the bitstream conforms to a profile other than the Main profile.

reserved_profile_compatibility_22 shall be equal to 0 in bitstreams conforming to this version of this Specification. Other values for reserved_profile_compatibility_22bits are reserved for future use by ISO/IEC. Decoders shall ignore the value of reserved_profile_compatibility_2bits.

unique_point_positions_constraint_flag equal to 1 indicates that in each point cloud frame that refers to the current SPS, all output points have unique positions. unique_point_positions_constraint_flag equal to 0 indicates that in any point cloud frame that refers to the current SPS, two and more output points may have the same position.

Note—For example, even if all points are unique in each slices, the points from different slices in a frame may overlap. In that case, unique_point_positions_constraint_flag should be set to 0.

level_idc indicates a level to which the bitstream conforms as specified in Annex A. Bitstreams shall not contain values of level_idc other than those specified in Annex A. Other values of level_idc are reserved for future use by ISO/IEC.

sps_seq_parameter_set_id provides an identifier for the SPS for reference by other syntax elements. The value of sps_seq_parameter_set_id shall be 0 in bitstreams conforming to this version of this Specification. The value other than 0 for sps_seq_parameter_set_id is reserved for future use by ISO/IEC.

sps_bounding_box_present_flag equal to 1 indicates that bounding box parameters are signalled in the SPS. sps_bounding_box_present_flag equal to 0 indicates that the size of the bounding box is undefined.

sps_bounding_box_offset_x,sps_bounding_box_offset_y, and sps_bounding_box_offset_z indicate quantised x, y, and z offsets of the source bounding box in Cartesian coordinates. When not present, the values of sps_bounding_box_offset_x, sps_bounding_box_offset_y, and sps_bounding_box_offset_z are each inferred to be 0.

sps_bounding_box_offset log 2_scale indicates the scaling factor to scale the quantised x, y, and z source bounding box offsets. When not present, the value of sps_bounding_box_offset_log 2_scale is inferred to be 0.

sps_bounding_box_size_width, sps_bounding_box_size_height, and sps_bounding_box_size_depth indicate the width, height, and depth of the source bounding box in Cartesian coordinates.

sps_source_scale_factor_numerator_minus1 plus 1 indicates the scale factor numerator of the source point cloud.
sps_source_scale_factor_denominator_minus1 plus 1 indicates the scale factor denominator of the source point cloud.

In addition to the source bounding box, a G-PCC coder may determine (e.g, specify) tile bounding boxes. Tile bounding boxes may be associated with the points of a tile. A G-PCC encoder (e.g., G-PCC encoder 200) may signal the tile bounding boxes in the tile_inventory( ) syntax. Each tile_inventory( ) syntax structure may be associated with a frame specified by tile_frame_idx.

The table below represents an example tile inventory syntax structure:

|  | Descriptor |
|---|---|
| tile_inventory( ) { |  |
|    tile_frame_idx | ? |
|    num_tiles_minus1 | u(16) |
|    for( i = 0; i <= num_tiles_minus1; i++ ) { |  |
|       tile_bounding_box_offset_x[ i ] | se(v) |
|       tile_bounding_box_offset_y[ i ] | se(v) |
|       tile_bounding_box_offset_z[ i ] | se(v) |
|       tile_bounding_box_size_width[ i ] | ue(v) |
|       tile_bounding_box_size_height[ i ] | ue(v) |
|       tile_bounding_box_size_depth[ i ] | ue(v) |
|    } |  |
|    byte_alignment( ) |  |
| } |  |

Semantics for the example tile inventory syntax structure may be defined as follows:

num_tiles_minus1 plus 1 specifies the number of tile bounding boxes present in the tile inventory.

tile_bounding_box_offset_x[i], tile_bounding_box_offset_y[i], and tile_bounding_box_offset_z[i] indicate the x, y, and z offsets of the i-th tile in cartesian coordinates.

tile_bounding_box_size_width[i], tile_bounding_box_size_height[i], and tile_bounding_box_size_depth[i] indicate the width, height, and depth of the i-th tile in the Cartesian coordinates.

Although a bounding box may not explicitly specified for slices, a G-PCC coder (e.g., G-PCC encoder 200 or G-PCC decoder 300) may determine (e.g., specify) a box may that includes the points in a slice (which may be referred to as a slice box or slice bounding box). The specification of the slice box may include a slice origin that specifies one corner of the box and the width, height and depth of the box.

A geometry parameter set (GPS) may have indication whether an explicit slice origin is signaled for slices. If an explicit slice origin is present, a G-PCC encoder (e.g., G-PCC encoder 200) may signal an associated scale value at the GPS or at the Geometry slice header (GSH). When explicit slice origin is not signaled, a G-PCC decoder (e.g., G-PCC decoder 300) may infer the associated scale value to be equal to (0, 0, 0).

Example syntax structures for a slice (bounding) box are shown in the tables below, which include examples of a GPS and a geometry slice header.

|  | Descriptor |
|---|---|
| geometry_parameter_set( ) { |  |
|    gps_geom_parameter_set_id | ue(v) |
|    gps_seq_parameter_set_id | ue(v) |
|    gps_box_present_flag | u(1) |
|    if( gps_box_present_flag ){ |  |
|       gps_gsh_box_log2_scale_present_flag | u(1) |
|       if( gps_gsh_box_log2_scale_present_flag = = 0 ) |  |
|          gps_gsh_box_log2_scale | ue(v) |
|    } |  |
|    unique_geometry_points_flag | u(1) |
|    geometry_slice_header( ) { |  |

-continued

|  | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { |  |
|     if( gps_gsh_box_log2_scale_present_flag ) |  |
|         gsh_box_log2_scale | ue(v) |
|     gsh_box_origin_x | ue(v) |
|     gsh_box_origin_y | ue(v) |
|     gsh_box_origin_z | ue(v) |
| } |  |
| if ( gps_implicit_geom_partition_flag ) { |  |
|     gsh_log2_max_nodesize_x | ue(v) |
|     gsh_log2_max_nodesize_y_minus_x | se(v) |
|     gsh_log2_max_nodesize_z_minus_y | se(v) |
| } else { |  |
|     gsh_log2_max_nodesize | ue(v) |
| } |  |
| _minus1  if( geom_scaling_enabled_flag ) { |  |
|     [Ed: this should be last in the gsh?] |  |

Semantics for the syntax elements of the example GPS above may be defined as follows:

gps_geom_parameter_set_id provides an identifier for the GPS for reference by other syntax elements. The value of gps_seq_parameter_set_id shall be in the range of 0 to 15, inclusive.

gps_seq_parameter_set_id specifies the value of sps_seq_parameter_set_id for the active SPS. The value of gps_seq_parameter_set_id shall be in the range of 0 to 15, inclusive.

gps_box_present_flag equal to 1 specifies an additional bounding box information is provided in a geometry header that references the current GPS. gps_bounding_box_present_flag equal to 0 specifies that additional bounding box information is not signalled in the geometry header.

gps_gsh_box_log 2_scale_present_flag equal to 1 specifies gsh_box_log 2_scale is signalled in each geometry slice header that references the current GPS.

gps_gsh_box_log 2_scale_present_flag equal to 0 specifies gsh_box_log 2_scale is not signalled in each geometry slice header and common scale for all slices is signalled in gps_gsh_box_log 2_scale of current GPS.

gps_gsh_box_log 2_scale indicates the common scale factor of bounding box origin for all slices that references the current GPS.

The following are the semantics of the relevant syntax elements in the Geometry slice header:

gsh_geometry_parameter_set_id specifies the value of the gps_geom_parameter_set_id of the active GPS.

gsh_tile_id specifies the value of the tile id that is referred to by the GSH. The value of gsh_tile_id shall be in the range of 0 to XX, inclusive.

gsh_slice_id identifies the slice header for reference by other syntax elements. The value of gsh_slice_id shall be in the range of 0 to XX, inclusive.

frame_idx specifies the log 2_max_frame_idx+1 least significant bits of a notional frame number counter. Consecutive slices with differing values of frame_idx form parts of different output point cloud frames. Consecutive slices with identical values of frame_idx without an intervening frame boundary marker data unit form parts of the same output point cloud frame.

gsh_num_points specifies the maximum number of coded points in the slice. It is a requirement of bitstream conformance that gsh_num_points is greater than or equal to the number of decoded points in the slice.

gsh_box_log 2_scale specifies the scaling factor of bounding box origin for the slice.

gsh_box_origin_x specifies the x value of bounding box origin that scaled by gsh_box_log 2_scale value.

gsh_box_origin_y specifies the y value of bounding box origin that scaled by gsh_box_log 2_scale value gsh_box_origin_z specifies the z value of bounding box origin that scaled by gsh_box_log 2_scale value.

The variable slice_origin_x, slice_origin_y, and slice_origin_z are derived as follows:

If gps_gsh_box_log 2_scale_present_flag is equal to 0, originScale is set equal to gsh_box_log 2_scale Otherwise (gps_gsh_box_log 2_scale_present_flag is equal to 1), originScale is set equal to gps_gsh_box_log 2_scale If gps_box_present_flag is equal to 0, the value of slice_origin_x and slice_origin_y and slice_origin_z are inferred to be 0.

Otherwise (gps_box_present_flag is equal to 1), the following applies:

slice_origin_x=gsh_box_origin_x<<originScale slice_origin_y=gsh_box_origin_x<<originScale slice_origin_z=gsh_box_origin_x<<originScale gsh_log 2_max_nodesize_x specifies the bounding box size in the x dimension, i.e., MaxNodesizeXLog 2 that is used in the decoding process as follows.

MaxNodeSizeXLog 2=gsh_log 2_max_nodesize_x

MaxNodeSizeX=1<<MaxNodeSizeXLog 2 gsh_log 2_max_nodesize_y_minus_x specifies the bounding box size in the y dimension, i.e., MaxNodesizeYLog2 that is used in the decoding process as follows:

MaxNodeSizeYLog 2=gsh_log 2_max_nodesize_y_minus_x+MaxNodeSizeXLog2.

MaxNodeSizeY=1<<MaxNodeSizeYLog 2.

gsh_log 2_max_nodesize_z_minus_y specifies the bounding box size in the z dimension, i.e., MaxNodesizeZLog 2 that is used in the decoding process as follows.

MaxNodeSizeZLog 2=gsh_log 2_max_nodesize_z_minus_y+MaxNodeSizeYLog 2

MaxNodeSizeZ=1<<MaxNodeSizeZLog 2

If gps_implicit_geom_partition_flag equals to 1, gsh_log 2_max_nodesize is derived as follows.

gsh_log 2_max_nodesize=max{MaxNodeSizeXLog2, MaxNodeSizeYLog 2, MaxNodeSizeZLog 2}
gsh_log 2_max_nodesize specifies the size of the root geometry octree node when gps_implicit_geom_partition_flag is equal to 0. The variables MaxNodeSize, and MaxGeometryOctreeDepth are derived as follows.
MaxNodeSize=1<<gsh_log 2_max_nodesize
MaxGeometryOctreeDepth=gsh_log 2_max_nodesize−log 2 trisoup_node_size
The variables K and M are then updated as follows.

```
gsh_log2_min_nodesize = min{ MaxNodeSizeXLog2,
MaxNodeSizeYLog2,
MaxNodeSizeZLog2}
    if (K > (gsh_log2_max_nodesize − gsh_log2_min_nodesize))
        K = gsh_log2_max_nodesize − gsh_log2_min_nodesize;
    if (M > gsh_log2_min_nodesize)
        M = gsh_log2_min_nodesize;
    if (gsh_log2_max_nodesize == gsh_log2_min_nodesize)
        M = 0;
    if (log2_trisoup_node_size != 0) {
        K = gsh_log2_max_nodesize − gsh_log2_min_nodesize;
        M = 0;
    }
```

In addition to the bounding boxes specified above, a G-PCC coder (e.g., G-PCC encoder 200 or G-PCC decoder 300) may support the signaling of a region box that is used to indicate a modified QP value to the attributes of a particular region of the point cloud. Typically, the QP value associated with an attribute may be specified in the attribute slice header (in addition to some syntax elements in the attribute parameter set). However, certain regions of the point cloud may have peculiar characteristics that may be different from the rest of the slice; e.g., a denser region of the slice may require a finer representation (lower QP) or a sparser region of the slice may only need a coarser representation (higher QP). The region box may be useful for specifying a different QP for attributes of certain region of a slice.

The following table represents an example attribute slice header including region box related syntax elements:

| | Descriptor |
|---|---|
| attribute_slice_header( ) { | |
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   } | |
|   ash_attr_layer_qp_delta_present_flag | u(1) |
|   if ( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] > 0 ) | |
|         ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_qp_region_box_delta | se(v) |
|   } | |
|   byte_alignment( ) | |
| } | |

Semantics for the region box syntax elements in the table above may be defined as follows:

ash_attr_parameter_set_id specifies the value of the aps_attr_parameter_set_id of the active APS.

ash_attr_sps_attr_idx specifies the order of attribute set in the active SPS. The value of ash_attr_sps_attr_idx shall be in the range of 0 to sps_num_attribute_sets in the active SPS.

ash_attr_geom_slice_id specifies the value of the gsh_slice_id of the active Geometry Slice Header.

ash_attr_layer_qp_delta_present_flag equal to 1 specifies that the ash_attr_layer_qp_delta_luma and ash_attr_layer_qp_delta_chroma syntax elements are present in current ASH. ash_attr_layer_qp_delta_present_flag equal to 0 specifies that the ash_attr_layer_qp_delta_luma and ash_attr_layer_qp_delta_chroma syntax elements are not present in current ASH.

ash_attr_num_layer_qp_minus1 plus 1 specifies the number of layer in which ash_attr_qp_delta_luma and ash_attr_qp_delta_chroma are signalled. When ash_attr_num_layer_qp is not signalled, the value of ash_attr_num_layer_qp is inferred to be 0. The value of NumLayerQp is derived as follows:

NumLayerQp=num_layer_qp_minus1+1 ash_attr_qp_delta_luma specifies the luma delta qp from the initial slice qp in the active attribute parameter set. When ash_attr_qp_delta_luma is not signalled, the value of ash_attr_qp_delta_luma is inferred to be 0.

ash_attr_qp_delta_chroma specifies the chroma delta qp from the initial slice qp in the active attribute parameter set. When ash_attr_qp_delta_chroma is not signalled, the value of ash_attr_qp_delta_chroma is inferred to be 0.

The variables InitialSliceQpY and InitialSliceQpC are derived as follows:

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma ash_attr_layer_qp_delta_luma specifies the luma delta qp from the InitialSliceQpY in each layer. When ash_attr_layer_qp_delta_luma is not signalled, the value of ash_attr_layer_qp_delta_luma of all layers are inferred to be 0.

ash_attr_layer_qp_delta_chroma specifies the chroma delta qp from the InitialSliceQpC in each layer. When ash_attr_layer_qp_delta_chroma is not signalled, the value of ash_attr_layer_qp_delta_chroma of all layers are inferred to be 0. The variables SliceQpY[i] and SliceQpC[i] with i=0 . . . NumLayerQPNumQPLayer−1 are derived as follows:

```
for ( i = 0; i < NumLayerQPNumQPLayer; i++) {
    SliceQpY[ i ] = InitialSliceQpY +
        ash_attr_layer_qp_delta_luma[ i ]
    SliceQpC[ i ] = InitialSliceQpC +
        ash_attr_layer_qp_delta_chroma[ i ]
}
``` ash_attr_region_qp_delta_present_flag equal to 1 indicates the ash_attr_region_qp_delta and region bounding box origin and size are present in current ASH. ash_attr_region_qp_delta_present_flag equal to 0 indicates the ash_attr_region_qp_delta and region bounding box origin and size are not present in current ASH.

ash_attr_qp_region_box_origin_x indicates the x offset of the region bounding box relative to slice_origin_x. When not present, the value of ash_attr_qp_region_box_origin_x is inferred to be 0.

ash_attr_qp_region_box_origin_y indicates the y offset of the region bounding box relative to slice_origin_y. When not present, the value of ash_attr_qp_region_box_origin_y is inferred to be 0.

ash_attr_qp_region_box_origin_z indicates the z offset of the region bounding box relative to slice_origin_z. When not present, the value of ash_attr_qp_region_box_origin_z is inferred to be 0.

The variable RegionboxX, RegionboxY and RegionboxZ specifying the region box origin are set equal to ash_attr_qp_region_box_origin_x, ash_attr_qp_region_box_origin_y and ash_attr_qp_region_box_origin_z respectively.

ash_attr_qp_region_box_size_width indicates the width of the region bounding box. When not present, the value of ash_attr_qp_region_box_size_width is inferred to be 0.

ash_attr_qp_region_box_size_height indicates the height of the region bounding box. When not present, the value of ash_attr_qp_region_box_size_height is inferred to be 0.

ash_attr_qp_region_box_size_depth indicates the depth of the region bounding box. When not present, the value of ash_attr_qp_region_box_size_depth is inferred to be 0.

The variable RegionboxWidth, RegionboxHeight and RegionboxDepth specifying the region box size are set equal to ash_attr_qp_region_box_size_width, ash_attr_qp_region_box_size_height and ash_attr_qp_region_box_size_depth respectively.

ash_attr_region_qp_delta specifies the delta qp from the SliceQpY[i] and SliceQpC[i](with i=0 . . . NumLayerQPNumQPLayer−1) of the region specified by ash_attr_qp_region_box. When not present, the value of ash_attr_region_qp_delta is inferred to be 0.

The variable RegionboxDeltaQp specifying the region box delta quantization parameter is set equal to ash_attr_region_qp_delta.

A G-PCC coder (e.g., G-PCC encoder 200 or G-PCC decoder 300) may control quantization and/or scaling of geometry coordinates and/or positions within the codec, or geometry scaling as referred to in G-PCC, by a flag in the geometry parameter set and a QP value. The G-PCC encoder may specify and/or modify the QP value in multiple levels. The syntax elements associated with geometry scaling in the various parts of the syntax are described below.

2.6.1 Geometry parameter set

|  | Descriptor |
| --- | --- |
| geometry_parameter_set( ) { |  |
|     gps_geom_parameter_set_id | ue(v) |
|     ... | ue(v) |
|     geom_scaling_enabled_flag | u(1) |
|     if( geom_scaling_enabled_flag ) |  |
|         geom_base_qp | ue(v) |
|     ... | u(1) |
| } |  |

The syntax element geom_scaling_enabled_flag may enable a G-PCC decoder (e.g., G-PCC decoder 300) to scale the geometry coordinates. A G-PCC coder (e.g., G-PCC encoder 200 or G-PCC decoder 300) may use geom_base_qp to derive the scale value used in the process.

An example set of syntax elements for a geometry slice header is shown in the table below:

|  | Descriptor |
| --- | --- |
| geometry_slice_header( ) { |  |
|     gsh_geometry_parameter_set_id | ue(v) |
|     ... |  |
|     if( geom_scaling_enabled_flag ) { |  |
|         [Ed: this should be last in the gsh?] |  |
|         geom_slice_qp_offset | se(v) |
|         geom_octree_qp_offsets_enabled_flag | u(1) |
|         if( geom_octree_qp_offsets_enabled_flag ) |  |
|             geom_octree_qp_offsets_depth | ue(v) |
|     } |  |
|     byte_alignment( ) |  |
| } |  |

In the geometry slice header (GSH), a G-PCC encoder (e.g., G-PCC encoder 200) may signal a QP offset that is used to modify the scale value used for points belonging to the slice. The GSH may include or contain a flag, (geom_octree_qp_offsets_enabled_flag) that controls whether QP offset control is enabled in lower octree levels and if yes, the depth (geom_octree_qp_offsets_depth) at which the QP parameter is specified is signaled.

An example set of syntax elements for a geometry node structure is shown in the table below:

|  | Descriptor |
| --- | --- |
| geometry_node( depthX, depthY, depthZ, partitionSkip, nodeIdx, xN, yN, zN ) { |  |
|     if( depth = = GeomScalingDepth && geom_octree_qp_offsets_enabled_flag) { |  |
|         geom_node_qp_offset_eq0_flag | ae(v) |
| [Ed: sense mismatch between m50924 and CE implementation] |  |
|         if( !geom_node_qp_offset_eq0_flag) { |  |
|             geom_node_qp_offset_sign_flag | ae(v) |
|             geom_node_qp_offset_abs_minus1 | ae(v) |
|         } |  |
|     } |  |
|     ... |  |
| } |  |

When the current octree depth is equal to GeomScalingDepth as derived from geom_octree_qp_offsets_depth, a G-PCC coder (e.g., G-PCC encoder 200 or G-PCC decoder 300) may apply a QP offset for the points belonging to that node.

A G-PCC encoder (e.g., G-PCC encoder 200) may determine the QP value for the geometry scale factor depending on the node that is being processed. The scaling process may modify the effective node size of the child nodes, and this may be determined by the process described below. In this process, when depth of the octree node is less than GeomScalingDepth, a G-PCC encoder (e.g., G-PCC encoder 200) may lossless code the coordinates or the bits (e.g., QP equal to 4). When the depth is equal to GeomScalingDepth, the QP may be set equal to the sum of the geom_base_qp, geom_slice_qp_offset and nodeQpOffset. For a depth larger than GeomScalingDepth, the QP may be set equal to the QP of the parent tree depth (which may be the same as the QP at GeomScalingDepth).

The variable NodeQp is derived as follows:
When depth is equal to GeomScalingDepth:
NodeQp=geom_base qp+geom_slice_qp_offset+nodeQpOffset
When depth is greater than GeomScalingDepth:
NodeQp=NodeQpMap[depth][nodeIdx]
Otherwise, depth is less than GeomScalingDepth, NodeQp is set equal to 4.
The variables EffectiveChildNodeSizeLog 2 and EffectiveDepth are derived as follows:
EffectiveChildNodeSizeLog 2=ChildNodeSizeLog 2−(NodeQp−4)/6
EffectiveDepth=depth+(NodeQp−4)/6

The geometry scaling process at the decoder (e.g., G-PCC decoder 300) may be invoked in Section 8.2.2.2 Octree node decoding process (e.g., shown below), where the geomScale( ) function is used. At each node, a G-PCC coder (e.g., G-PCC encoder 200 or G-PCC decoder 300) may derive the positions corresponding to the child nodes; there are GeometryNodeChildrenCnt child nodes. The value of GeometryNodeChildrenCnt may be at most 8. The index of the child nodes within the GeometryNodeChildrenCnt child nodes may be specified using a 3 bit number, and a quantized position of the child node (x, y, z) are derived from the coordinates of the parent node (xN, yN, zN) and childIdx. For each child node, the G-PCC coder may derive the unquantized (scaled) position PointPos[ ][i] for i=0, 1, 2 using the geomScale( ) function. For nodes that coded using the direct coding mode (indicated by direct_mode_flag), the G-PCC coder may obtain the respective scaled positions from the child node position and the PointOffsetX[ ], PointOffsetY[ ] and PointOffsetZ[ ] values, also using the geomScale( ) function.

Inputs to an octree node decoding process may include:
an octree node location (depth, nodeIdx) specifying the position of the current geometry octree node
a spatial location (xN, yN, zN) specifying the position of the current geometry octree node in the current slice.

The outputs of this process may include the modified array PointPos and the updated variable PointCount.

If both EffectiveDepth is less than MaxGeometryOctreeDepth−1, and direct_mode_flag is equal to 0, no points are output by this process. Otherwise, if either EffectiveDepth is greater than or equal to MaxGeometryOctreeDepth−1, or direct_mode_flag is equal to 1, the remainder of this process generates one or more point positions.

The function geomScale(val, cIdx) is defined as the invocation of the scaling process for a single octree node position component 8.2.2.3 with the position val, the component cIdx, and the variable qP set equal to NodeQp as inputs.

The spatial location of points in each occupied child is determined according to the number of duplicate points in each child and the use of direct coded positions as follows:

The scaling of the node position using the QP is derived using the geomScale( ) function as follows:

```
for( child = 0; child < GeometryNodeChildrenCnt; child++ ) {
    childIdx = GeometryNodeChildren[ child ];
    x = 2 × xN + ( childIdx & 4 ) = = 1 ;
    y = 2 × yN + ( childIdx & 2 ) = = 1 ;
    z = 2 × zN + ( childIdx & 1 ) = = 1 ;
    for( i = 0; i < GeometryNodeDupPoints[ child ] + 1 ; i++, PointCount++ ) {
        PointPos[ PointCount ][ 0 ] = geomScale( x , 0);
        PointPos[ PointCount ][ 1 ] = geomScale( y , 1);
        PointPos[ PointCount ][ 2 ] = geomScale( z , 2);
    }
    if( direct_mode_flag ) {
        if (!duplicated_point_flag) {
            for( i = 0; i <= num_direct_points_minus1; i++, PointCount++ ) {
                PointPos[ PointCount ][ 0 ]  =  geomScale( ( x  <<  EffectiveChildNodeSizeLog2 ) + PointOffsetX[ i ] , 0);
                PointPos[ PointCount ][ 1 ]  =  geomScale( ( y  <<  EffectiveChildNodeSizeLog2 ) + PointOffsetY[ i ] , 1);
                PointPos[ PointCount ][ 2 ]  =  geomScale( ( z  <<  EffectiveChildNodeSizeLog2 ) + PointOffsetZ[ i ] , 2);
            }
        }
        else {
            for( i = 0; i <= num_direct_points_minus1; i++, PointCount++ ) {
                PointPos[ PointCount ][ 0 ]  =  geomScale( ( x  <<  EffectiveChildNodeSizeLog2 ) + PointOffsetX[ 0 ] , 0);
                PointPos[ PointCount ][ 1 ]  =  geomScale( ( y  <<  EffectiveChildNodeSizeLog2 ) + PointOffsetY[ 0 ] , 1);
                PointPos[ PointCount ][ 2 ]  =  geomScale( ( z  <<  EffectiveChildNodeSizeLog2 ) + PointOffsetZ[ 0 ] , 2);
            }
        }
    }
}
```

In the geomScale( ) function, the node position is scaled and the inverse-quantized position value is derived as described below:

Inputs to an example scaling process for a single octree node position component may include:
a variable val representing an unscaled position component value,
a variable cIdx specifying the position component index,
a variable qP specifying the quantization parameter.

The output of this process may include the scaled position component value pos.

(NOTE?) When geom_scaling_enabled_flag is equal to 0, the output of this process is equal to the input value pos.

The variable scalingExpansionLog 2 is set equal to (qP−4)/6.

Figure 4:
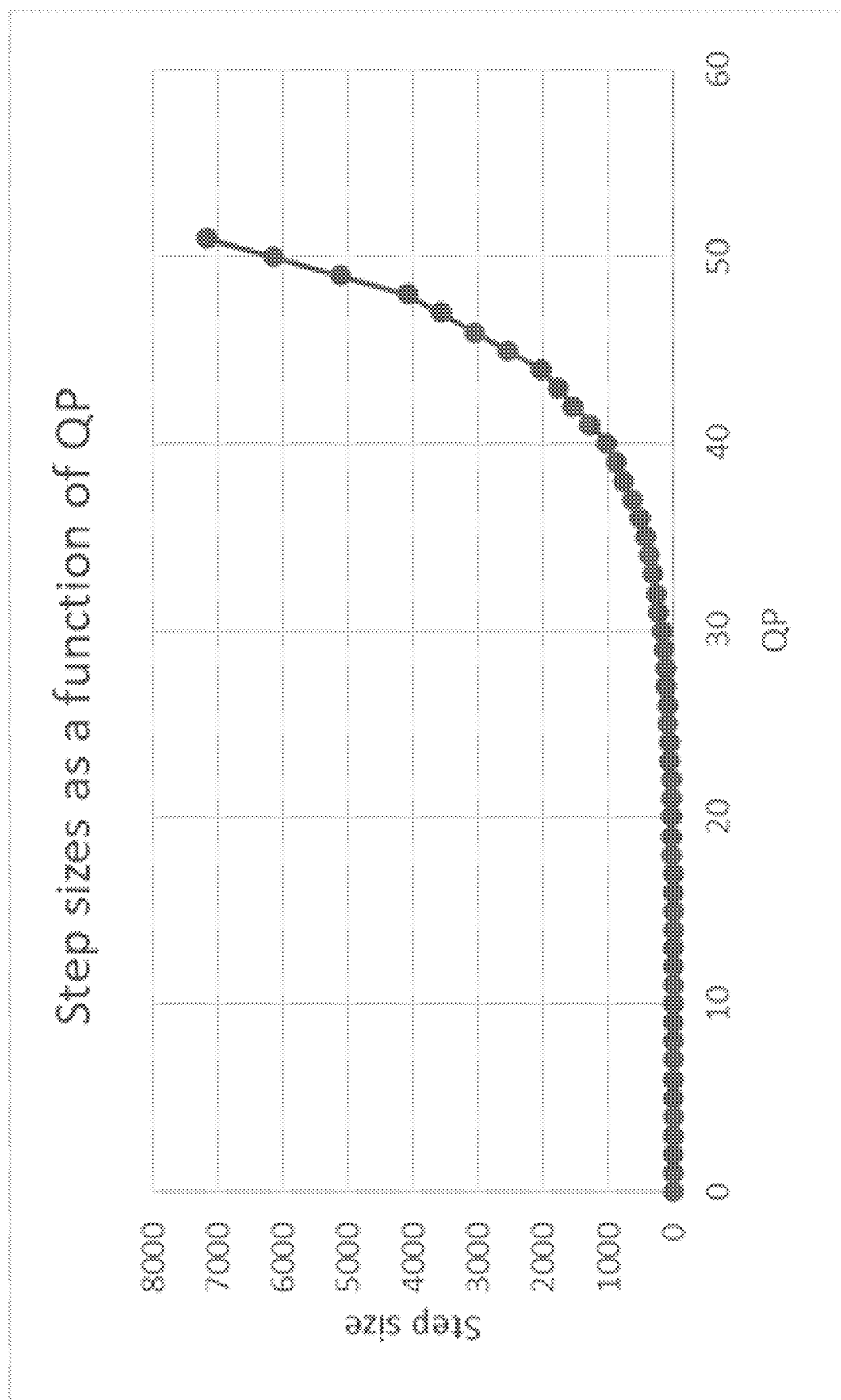
FIG. 4 is a graph illustrating an example step size function.

The variables highPart and lowPart representing concatenated parts of the unscaled position component value are derived as follows:
   1 highPart=val>>(ScalingNodeSizeLog 2[cIdx]−scalingExpansionLog 2)
   2 lowPart=val & ((1<<(ScalingNodeSizeLog 2[cIdx]−scalingExpansionLog 2))−1)
The list geomLevelScale is specified as geomLevelScale[i]={659445, 741374, 831472, 933892, 1048576, 1175576} with i=0 . . . 5.
   The output variable pos is derived as follows:
   3 highPartS=highPart<<ScalingNodeSizeLog 2[cIdx]
   4 lowPartS=(lowPart*(geomLevelScale[qP % 6]<<(qP/6))+(1<<19))>>20
   5 pos=highPart|lowPart
   An alternate mechanism to the geometry scaling process was proposed in G-PCC: Integer step sizes for in-tree geometry quantisation, m52522, D. Flynn, K. Mammou, Brussels, Belgium, January 2020 (hereinafter, "m52522"), where the following step sizes were used for the scaling operation.
   geomLevelScale[i]={1, 1.25, 1.5, 1.75}
   In some examples, a G-PCC coder (e.g., G-PCC encoder 200 or G-PCC decoder 300) may use scaled versions of the above values for fixed-point implementation (e.g., values 4, 5, 6, 7); a shift and rounding operations may be accompanied to bring apply the correct scale factor. The QP value of 0 may correspond to the lossless case (e.g., a scale value 1) and the QP step sizes doubles for every four QP values. The G-PCC coder may derive the step sizes as follows, where floor( ) stands for the floor operation:
   $qS=(1/4)*[4+(QP \mod 4)]*2^{floor(QP/4)}$
   FIG. 4 is a graph illustrating an example step size function. The resultant step sizes for most QPs are integers but some non-integer step sizes are also specified. Table 1 specifies the step sizes for various QP values, and FIG. 4 illustrates the same step size function.

TABLE 1

| QP | StepSize |
|---|---|
| 0 | 1 |
| 1 | 1.25 |
| 2 | 1.5 |
| 3 | 1.75 |
| 4 | 2 |
| 5 | 2.5 |
| 6 | 3 |
| 7 | 3.5 |
| 8 | 4 |
| 9 | 5 |
| 10 | 6 |
| 11 | 7 |
| 12 | 8 |
| 13 | 10 |
| 14 | 12 |
| 15 | 14 |
| 16 | 16 |
| 17 | 20 |
| 18 | 24 |
| 19 | 28 |
| 20 | 32 |
| 21 | 40 |
| 22 | 48 |
| 23 | 56 |
| 24 | 64 |
| 25 | 80 |
| 26 | 96 |
| 27 | 112 |
| 28 | 128 |
| 29 | 160 |

TABLE 1-continued

| QP | StepSize |
|---|---|
| 30 | 192 |
| 31 | 224 |
| 32 | 256 |
| 33 | 320 |
| 34 | 384 |
| 35 | 448 |
| 36 | 512 |
| 37 | 640 |
| 38 | 768 |
| 39 | 896 |
| 40 | 1024 |
| 41 | 1280 |
| 42 | 1536 |
| 43 | 1792 |
| 44 | 2048 |
| 45 | 2560 |
| 46 | 3072 |
| 47 | 3584 |
| 48 | 4096 |
| 49 | 5120 |
| 50 | 6144 |
| 51 | 7168 |

One or more techniques described in this disclosure may be applied independently or in combination. For the ease of description, the term geometric period of a sequence may be defined as the number of points in a sequence for the value to double. For example, for the following sequence: 1, 1.5, 2, 3, 4, 6, 8, 12, . . . , the geometric period is 2. For the sequence 1, 1.1, 1.2, 1.4, 1.5, 2, 2.2, 2.4, 2.8, 3, 4, . . . the geometric period is 5. Note that if there is a combination of two sequences with different geometric periods, the two geometric period would apply to the respective points in the combined sequences. For example, the following sequence has a geometric period of 2 for values up to 8 and beyond 8, has a geometric period of 4: 1, 1.5, 2, 3, 4, 6, 8, 10, 12, 14, 16, 20, 24, 28, 32, . . . .

The values between any two powers or 2 may also be referred to as a geometric period. For example, for the sequence 1, 1.1, 1.2, 1.4, 1.5, 2, 2.2, 2.4, 2.8, 3, 4, . . . , the first geometric period may be [1, 1.1, 1.2, 1.4, 1.5] and the second geometric period may be [2, 2.2, 2.4, 2.8, 3] and so on.

Currently, although the semantics of the SPS bounding box are specified, the specification (e.g., processes compliant with the specification) does not explicitly mention how the point cloud data are related to the SPS bounding box. The G-PCC bitstream also carries two syntax elements to derive a scale factor, but again the exact process to use these syntax elements are not specified.

In the TMC13 (test model), the output geometry points of the point cloud data are scaled using the scale factor, and the non-normative scaled points are clipped to be within the SPS bounding box.

The scaling and clipping process used in the TMC13 seem to be straight-forward. However, lack of a clear description in the specification of how to use the syntax elements, or even indication of how to use the syntax elements, could result in undesirable situations. For example, it is possible that an "evil" encoder may deliberately try to signal values that are incorrect in such a way that only certain decoders (that know the intention of the "evil" encoder) would be able to correctly process these syntax elements; other decoders (or devices), despite being conformant, would be unable to process these syntax elements properly. Such scenarios should not be permitted in a standard.

At least the following should be specified: ranges and derivation process that use the syntax elements such that at least the syntax elements should make some sense for a normal decoder. It is to be noted that such a derivation does not preclude this scaling process to be non-normative.

A G-PCC coder (e.g., G-PCC encoder 200 or G-PCC decoder 300) may be configured to operate according to a scaling process using the non-normative scaling syntax elements.

A G-PCC coder (e.g., G-PCC encoder 200 or G-PCC decoder 300) may be configured to operate according to one or more constraints that the output of the above scaling value does not violate the SPS bounding box constraints.

A G-PCC coder (e.g., G-PCC encoder 200 or G-PCC decoder 300) may be configured such that a violation of SPS bounding box constraint may include that the scaled coordinate positions should not be larger the respective dimension of the source bounding box (e.g., the x coordinate should not exceed the width, y coordinate should not exceed the height, and the z coordinate should not exceed the depth).

A G-PCC coder (e.g., G-PCC encoder 200 or G-PCC decoder 300) may be configured such that a violation of SPS bounding box constraint may also include that the scaled coordinate positions should not be outside the bounding box specified by the bounding box boundaries (e.g., a min and max value for each dimension).

In some examples, the G-PCC coder may additionally perform clipping operations to clip the reconstructed point clouds after scaling to be contained within the bounding box. The G-PCC coder may be configured with restraints for the clipping operations, similar to the above, for a point, such that performance of the clipping operations ensure that a point contained within a tile bounding box of a tile that contains the point remains within the tile. That is, constraints may apply for clipping operations similar to the above for a point to be containing with the tile bounding box of the tile that contains the point.

Semantics of the example SPS bounding box and non-normative scaling process may be modified as discussed below. Thus, a G-PCC coder may code an SPS bounding box and perform a scaling process according to the example techniques explained below. The addition of these changes need not make the scaling process normative; whether or not the process is normative may be determined by how the conformance is specified for various G-PCC profile(s). The current TMC13-v9.0 still uses floating point operations for the non-normative scaling; this document describes techniques to specify fixed point arithmetic for the same. The source scale factor signalled in the current TMC13 is the inverse of the scale factor to be applied on the reconstructed point cloud, and the semantics below reflect that. In some examples, G-PCC coders may code data representative of the scale factor (instead of the inverse).

Example semantics for the SPS bounding box may be defined as follows, and G-PCC coders may code and interpret values of the SPS bounding box as follows: sps_bounding_box_present_flag equal to 1 indicates that bounding box parameters are signalled in the SPS. sps_bounding_box_present_flag equal to 0 indicates that the size of the bounding box is undefined.

sps_bounding_box_offset_x, sps_bounding_box_offset_y, and sps_bounding_box_offset_z indicate quantised x, y, and z offsets of the source bounding box in Cartesian coordinates. When not present, the values of sps_bounding_box_offset_x, sps_bounding_box_offset_y, and sps_bounding_box_offset_z are each inferred to be 0.

sps_bounding_box_offset log 2_scale indicates the scaling factor to scale the quantised x, y, and z source bounding box offsets. When not present, the value of sps_bounding_box_offset_log 2_scale is inferred to be 0.

sps_bounding_box_size_width, sps_bounding_box_size_height, and sps_bounding_box_size_depth indicate the width, height, and depth of the source bounding box in Cartesian coordinates.

sps_source_scale_factor_numerator_minus1 plus 1 indicates the scale factor numerator of the source point cloud. sps_source_scale_factor_denominator_minus1 plus 1 indicates the scale factor denominator of the source point cloud.

A G-PCC coder may derive a final position (xF, yF, zF) for a reconstructed position (x, y, z) of each point of the point cloud by dividing the reconstructed point positions by the source scale factor, clipping the result to the SPS bounding box dimensions, and shifting the points based on the SPS bounding box origin offsets as follows:

off=(sps_source_scale_factor_numerator_minus1+1)>>1
scaleNum=sps_source_scale_factor_numerator_minus1+1
scaleDen=sps_source_scale_factor_denominator_minus1+1
xS=(x*scaleDen+off)/scaleNum
yS=(y*scaleDen+off)/scaleNum
zS=(z*scaleDen+off)/scaleNum
bboxOffX=sps_bounding_box_offset_x<<
sps_bounding_box_offset log 2_scale
bboxOffY=sps_bounding_box_offset_y<<
sps_bounding_box_offset log 2_scale
bboxOffZ=sps_bounding_box_offset_z<<
sps_bounding_box_offset log 2_scale
xF=Min(xS, sps_bounding_box_width)+bboxOffX
yF=Min(yS, sps_bounding_box_height)+bboxOffY
zF=Min(zS, sps_bounding_box_depth)+bboxOffZ As described above, currently the non-normative quantization/scaling approach may assume to apply on the entire point cloud, whereas a G-PCC coder may apply normative quantization at certain node depth within slices. A G-PCC coder may have no mechanism available for quantizing the entire point cloud normatively. For several applications, it may be desirable for a G-PCC coder (e.g., G-PCC encoder 200 or G-PCC decoder 300) to apply point cloud scaling at a global level normatively so that the encoder/applications do not have to rely on how the decoders handle the non-normative scaling. Without a normative global scaling, the codec may have to rely on specifying the QP value for each slice, and even that may only be applied at the highest octree level.

Moreover, one of the purposes of the non-normative scaling is to convert the point cloud data into real world dimensions. It would be undesirable to re-use this for indicating quantization values.

A G-PCC coder (e.g., G-PCC encoder 200 or G-PCC decoder 300) may be configured to perform a normative scaling for the entire point cloud; this may be referred to as global scaling.

A G-PCC encoder (e.g., G-PCC encoder 200) may be configured to signal a syntax element to indicate whether normative global scaling is applied to a picture.

Global scaling may be applied at the encoder at the beginning of the encoding; at the decoder, this may be applied after all the slice are decoded. For example, a G-PCC coder (e.g., G-PCC encoder 200 or G-PCC decoder 300) may be configured to apply global scaling at the beginning of encoding, at the decoder, after all the slices are decoded, etc.

In some examples, a G-PCC coder (e.g., G-PCC encoder 200 or G-PCC decoder 300) may apply the global scaling to each point cloud partition that is applicable to a slice separately; similarly, each decoded slice may apply global scaling independently.

A G-PCC decoder (e.g., G-PCC decoder 300) may control the global scaling factor by a scale value that is signaled (e.g., by G-PCC encoder 200) in the bitstream.

A G-PCC coder (e.g., G-PCC encoder 200 or G-PCC decoder 300) may derive the scaling factor (or scale value) from a quantization parameter value that is signaled in the bitstream; the derivation of the scale value from the quantization parameter may use one or more existing schemes specified in the G-PCC codec or by other means.

In some examples, a G-PCC coder (e.g., G-PCC encoder 200 or G-PCC decoder 300) may restrict the global scaling factor to be a power of 2. This may enable the global scaling process to be applied with shift operations, which may be very simple to implement.

In some examples, a G-PCC coder (e.g., G-PCC encoder 200 or G-PCC decoder 300) may restrict the global scaling factor to be integer values (non-negative).

In some examples, a G-PCC coder (e.g., G-PCC encoder 200 or G-PCC decoder 300) may determine (e.g., specify) the global scaling factor using integer and non-integer values; the G-PCC coder may apply the scaling using floating point or fixed-point arithmetic.

A G-PCC decoder (e.g., G-PCC decoder 300) may derive the scaling factor from the non-normative scaling factor signaled (e.g., by G-PCC encoder 200) in the bitstream.

The scaling process itself may applied similar to a quantization process specified for the G-PCC codec.

A G-PCC coder (e.g., G-PCC encoder 200 or G-PCC decoder 300) may apply a fixed point implementation of the scaling process where the scale factor is stored at a particular precision, and the scaling operation includes an offset and bit shift operation. A rounding operation may be included in the scaling process.

One or more attributes may be combined at the encoder (e.g., G-PCC encoder 200) when the global scaling operation results in more than one point associated with a position.

In some examples, a G-PCC coder (e.g., G-PCC encoder 200 or G-PCC decoder 300) may be configured to prohibit global scaling when geometry points have unique positions, or vice versa (e.g., when geometry points do not have unique positions); the syntax may be updated to reflect these restrictions (e.g., by avoiding signalling of some elements). (This may be particularly relevant if scale values less than 1 are specified).

A G-PCC coder (e.g., G-PCC encoder 200 or G-PCC decoder 300) may apply the unique points restriction to be before the global scaling operation.

In some examples, a G-PCC coder (e.g., G-PCC encoder 200 or G-PCC decoder 300) may apply unique points restriction after the global scaling operation.

In some examples, a G-PCC coder may determine a respective quantization parameter for each of the three components separately and quantize/scale each component based on the respective quantization/scale parameter for the corresponding component. In various examples, the G-PCC coder may either derive or code data representative of the quantization/scale parameters for the three components along with in-loop geometry quantization.

In some examples, the G-PCC coder (e.g., G-PCC encoder 200 or G-PCC decoder 300) may store the output of the scaling operation at a higher bit depth than the input. This higher bit depth may be pre-determined, or it may be derived using the global scale parameters. For example, if the bit depth of the coordinates before global scaling is N, and the precision of the global scale refinement value is M, the internal bit depth may be set as M+N. G-PCC decoder 300 (or other application/entity at the decoding side) may use additional precision to better derive the coordinate positions. More generally, any value of higher bit depth may be chosen as an (intermediate) precision for the global-scaled coefficients. In some examples, the higher bit depth may be in the range of [N, N+M]. In some examples, the output of the scaling operation may be at a lower bit depth than the input. For example, the input values may have fractional precision, and after scaling, the scaled values may have only integer precision.

In some examples, the G-PCC coder may derive the maximum value of global scale from the maximum value of coordinates of the point cloud. For example, the G-PCC coder may determine the maximum QP value such that the step size does not exceed the maximum value of the coordinates of the point cloud.

The G-PCC coder may calculate the maximum value according to a bounding box that is calculated after the origin of the point cloud is shifted to (0,0,0). In some examples, the G-PCC coder may calculate the maximum value after adjusting the coordinates to a different origin. The G-PCC coder may code data representing the adjustment data for the different origin.

In some examples, the G-PCC coder may derive the maximum value of the coordinates from a normative bounding box of the point cloud.

In some examples, the G-PCC coder may determine a pre-determined factor (Z, where Z<=1) and the maximum QP value, such that the scale value does not exceed Z*maximum value of the coordinate of the point cloud.

In some examples, the G-PCC coder may determine the maximum value of the coordinate used for determining the maximum QP according to the minimum of the maximum values of the individual coordinates (e.g., min (maxValX, maxValY, maxValZ)).

If the maximum value is K, and refinement precision is specified using M bits, the value of the global scale factor may be restricted to be less than Ceil(log 2(K)), and the maximum value of the refinement may be restricted to be (1<<M)−1.

In some examples, the signalling of the SPS bounding box and the non-normative scale values may be conditioned by a flag. When these values are not signalled, the G-PCC coder may infer default values (e.g., scale value of 1, slice origin of (0,0,0), and dimensions inferred to a maximum value such as $2^{32}-1$.

In some examples, the signalling of non-normative scale values may be conditioned by a flag.

The scale value derivation from QP may be governed by an underlying step size derivation model. For example, a G-PCC coder (e.g., G-PCC encoder 200 or G-PCC decoder 300) may derive, in G-PCC, the scale value using an exponential model 2(QP−4)/6. This may result in several step sizes that are not a power of 2. A list of step sizes for this scale value model is shown in the following table (as Func2). An alternate approach was proposed in 3. G-PCC: Integer step sizes for in-tree geometry quantization, m52522, D. Flynn, K. Mammou, Brussels, Belgium, January 2020, and the scale values for this approach are also included in the table.

| QP | Func1 | Func2 |
|---|---|---|
| 0 | 1 | 1 |
| 1 | 1.25 | 1.122462 |
| 2 | 1.5 | 1.259921 |
| 3 | 1.75 | 1.414214 |
| 4 | 2 | 1.587401 |
| 5 | 2.5 | 1.781797 |
| 6 | 3 | 2 |
| 7 | 3.5 | 2.244924 |
| 8 | 4 | 2.519842 |
| 9 | 5 | 2.828427 |
| 10 | 6 | 3.174802 |
| 11 | 7 | 3.563595 |
| 12 | 8 | 4 |
| 13 | 10 | 4.489848 |
| 14 | 12 | 5.039684 |
| 15 | 14 | 5.656854 |
| 16 | 16 | 6.349604 |
| 17 | 20 | 7.12719 |
| 18 | 24 | 8 |
| 19 | 28 | 8.979696 |
| 20 | 32 | 10.07937 |
| 21 | 40 | 11.31371 |
| 22 | 48 | 12.69921 |
| 23 | 56 | 14.25438 |
| 24 | 64 | 16 |
| 25 | 80 | 17.95939 |
| 26 | 96 | 20.15874 |
| 27 | 112 | 22.62742 |
| 28 | 128 | 25.39842 |
| 29 | 160 | 28.50876 |
| 30 | 192 | 32 |
| 31 | 224 | 35.91879 |
| 32 | 256 | 40.31747 |
| 33 | 320 | 45.25483 |
| 34 | 384 | 50.79683 |
| 35 | 448 | 57.01752 |
| 36 | 512 | 64 |
| 37 | 640 | 71.83757 |
| 38 | 768 | 80.63495 |
| 39 | 896 | 90.50967 |
| 40 | 1024 | 101.5937 |
| 41 | 1280 | 114.035 |
| 42 | 1536 | 128 |
| 43 | 1792 | 143.6751 |
| 44 | 2048 | 161.2699 |
| 45 | 2560 | 181.0193 |
| 46 | 3072 | 203.1873 |
| 47 | 3584 | 228.0701 |
| 48 | 4096 | 256 |
| 49 | 5120 | 287.3503 |
| 50 | 6144 | 322.5398 |
| 51 | 7168 | 362.0387 |

Both the models include all the powers of 2. As mentioned previously, scale values that are powers of 2 are easy to apply as they can be implemented using shift operations; this may be quite convenient for simple decoders and also a convenient option for encoders to achieve a global scaling. However, only relying on powers of 2 may provide insufficient resolution for the quantization/scaling operations. A finer resolution of the scale factor would be preferable for some applications.

A G-PCC encoder (e.g., G-PCC encoder 200) may be configured to signal a first value that specifies the scale values as a power of 2 (coarse QP).

In some examples, this first value that specifies the scale values as power of 2 may be specified by a QP value, where the step size is derived from the QP values as $2^{QP}$ (QP 0 corresponds to scale 1, QP 1 corresponds to scale 2, QP 2 corresponds to scale 4, and so on).

A G-PCC encoder (e.g., G-PCC encoder 200) may be configured to signal a flag to indicate whether the scaling value includes a refinement. Signalling such a flag may enable applications/profiles to allow/disallow scale value refinement.

In some examples, when refinement is applied to derive the scale value, a G-PCC coder (e.g., G-PCC encoder 200 or G-PCC decoder 300) may constrain the refinement applied to derive the scale value to apply the refinement to all points in the point cloud.

A G-PCC encoder (e.g., G-PCC encoder 200) may be configured to signal a value to specify the refinement to be applied to derive the scale value.

A G-PCC coder (e.g., G-PCC encoder 200 or G-PCC decoder 300) may be configured to determine (e.g., specify) a precision value for the refinement. An n-bit precision may correspond to $2^n$ levels of refinement for each geometric period.

e.g., a 1-bit precision may allow two values to be specified for every geometric period (1, 1.5, 2, 3, 4, 6, 8, . . . ), a 2-bit precision will allow four values to be specified for every geometric period (1, 1.25, 1.5, 1.75, 2, 2.5, 3, 3.5, 4, 5, 6, 7, 8, . . . ).

The precision may be specified by a number of refinement levels in the geometric period E.g., 5 refinement levels may correspond to scale values as follows (1, 1.2, 1.4, 1.6, 1.8, 2, 2.4, 2.8, 3.2, 3.6, 4, 3.6, 4.2, . . . )

In some examples, a G-PCC encoder (e.g., G-PCC encoder 200) may be configured to determine (e.g., specify) a different precision to be different for different geometric periods. For example, for scale value less than or equal to 8, the G-PCC encoder may determine (e.g., specify) four refinement levels for each geometric period, and for scale values more than 8, the G-PCC encoder may determine (e.g, specify) six refinement levels per geometric period.

A G-PCC encoder (e.g., G-PCC encoder 200) may be configured to signal a value (refineVal) that specifies the refinement level to be applied within a geometric period. If there are N values of refinement for a particular geometric period, the G-PCC may signal the value to specify in the range of 0 to N−1, inclusive.

e.g., if four refinement levels are used, and a linear model is used (allowed scale values 1, 1.25, 1.5, 1.75, 2, 2.5, 3, 3.5, 4, 5, 6, 7, 8, . . . ), for specifying a scale value or 3, the coarse QP may be specified to be 1, and the refinement level may be specified to be 2.

A G-PCC coder (e.g., G-PCC encoder 200 or G-PCC decoder 300) may derive a refinedQP value from the coarse QP Qc and refineVal. For example, if there are N levels of refinement, the G-PCC coder may derive the refinedQP as Qc*N+refineVal.

Specifying a model to convert the refinement indication to a scale value is discussed in the following. In some examples, a G-PCC coder (e.g., G-PCC encoder 200 or G-PCC decoder 300) may use a linear model.

e.g., a linear model for N refinement levels may be specified; if the coarse QP is x and the refinement value is y (0<=y<N), the G-PCC coder may derive the scale value as $2^x*(1+y/N)$.

In some examples, a G-PCC coder (e.g., G-PCC encoder 200 or G-PCC decoder 300) may use an exponential model.

e.g., an exponential model for N refinement levels may be specified; if the coarse QP is x and the refinement value is y (0<=y<N), the G-PCC coder may derive the scale may as $2^x*2^{(y/N)}$.

In some examples, a G-PCC coder (e.g., G-PCC encoder 200 or G-PCC decoder 300) may use any non-linear model to calculate the scale values from the refinement.

In some examples, a G-PCC coder (e.g., G-PCC encoder 200 or G-PCC decoder 300) may use a table based approach to specify the values that correspond to refinement and the scale values may be specified at a particular bit-precision.

For example, 8 refinement levels may be specified as ref[ ]=[8, 9, 10, 11, 12, 13, 14, 15] (this corresponds to a linear refinement model with 8 refinement levels). And the scale value may be specified as $2^{x}*(ref[y]/8)$; the scale may be implemented in fixed point arithmetic with multiplication and bitshift, and in some case an offset before the bitshift.

In some examples, a G-PCC coder (e.g., G-PCC encoder 200 or G-PCC decoder 300) may apply different models to different geometric periods.

For example, the G-PCC coder may apply a linear model to a geometric period until a particular scale value, and a table-based model for the geometric periods after the particular scale value as follows: linear model with 4 refinement levels until period 8, and table based (with values 8, 9, 10, 11, 12, 14) approach after 8. [1, 1.25, 1.5, 2, 2.5, 3, 3.5, 4, 5, 6, 7, 8, 9, 10, 11, 12, 14, 16, 18, 20, 22, 24, 28, 32, . . . ]

In some examples, a G-PCC coder (e.g., G-PCC encoder 200 or G-PCC decoder 300) may derive equivalent models and step sizes/scale values using the refinedQP. The G-PCC coder may apply the QP refinement approach to any quantization process, including geometry scaling (global, or at node level) or attribute scaling, for video coding, or the like.

When a QP offset is to be applied to a QP design above, two techniques may be used. In a first example technique, when refinement levels are not applied, a G-PCC encoder (e.g., G-PCC encoder 200) may determine (e.g., specify) QP offsets with respect to the coarse QP; when refinement levels are applied, G-PCC encoder 200 may specify QP offsets with respect to the refinedQP. In a second example technique, G-PCC encoder 200 may specify the QP offsets as a coarse QP and a refinement value.

In some examples, the G-PCC coder may code data representing a number of bits used to specify precision. Then, depending on the number of bits, the G-PCC coder may code a refinement value.

In some examples, a G-PCC decoder may perform a normative scaling process that applies to an entire point cloud frame. The G-PCC decoder may perform the global scaling process after reconstruction of the point cloud. G-PCC coders may code a GPS including syntax elements of the example table below to denote the scaling process, where "[added: "added text" ] represents text that has been added relative to the existing GPS:

| | Descriptor |
|---|---|
| geometry_parameter_set( ) { | |
|     gps_geom_parameter_set_id | ue(v) |
|     ... | |
|     log2_trisoup_node_size | ue(v) |
|     [added: "global_scale_factor_log2 | ue(v)"] |
|     [added: "global_scale_refinement_enabled_flag | u(1)"] |
|     [added: "if( global_scale_refinement_enabled_flag )"] | |
|         [added: "global_scale_factor_refinement | u(3)"] |
|     geom_scaling_enabled_flag | u(1) |
|     if( geom_scaling_enabled_flag ) | |
|         geom_base_qp_minus4 | ue(v) |
|     gps_implicit_geom_partition_flag | u(1) |
|     if( gps_implicit_geom_partition_flag ) { | |
|         gps_max_num_impliqcit_qtbt_before_ot | ue(v) |
|         gps_min_size_implicit_qtbt | ue(v) |
|     } | |
|     gps_extension_flag | u(1) |
|     if( gps_extension_flag ) | |
|         while( more_data_in_byte_stream( ) ) | |
|             gps_extension_data_flag | u(1) |
|     byte_alignment( ) | |
| } | |

Semantics for the added syntax elements may be defined as follows:

global_scale_factor_log 2 is used to derive the global scale factor to be applied to the positions of the point cloud. When global-scale_factor_log 2 is equal to 0, the global scale factor is specified to be 1 and the global-scale_factor_refinement is not signalled. When global-scale_factor log 2 is equal to 1, the syntax element global_scale_refinement_enabled_flag is signalled.

global_scale_refinement_enabled_flag equal to 1 specifies that the syntax element global_scale_factor_refinement is signalled. global_scale_refinement_enabled_flag equal to 0 specifies that the syntax element global_scale_factor_refinement is not signalled. When not present, the value of global_scale_refinement_enabled_flag is inferred to be equal to 0.

global_scale_refinement_factor specifies the refinement to the global scale factor. When not present, the value of global_scale_refinement_factor is inferred to be equal to 0. The value of global_scale_refinement_factor shall be in the range of 0 to 7, inclusive.

A G-PCC coder may derive the global scale value as follows: GlobalScale=(8+global_scale_refinement_factor)<<global_scale_factor_log 2

A G-PCC coder may perform a slice concatenation process, forming outputs including:

the modified array RecPic with elements RecPic[pointIdx][attrIdx] representing points in the reconstructed point cloud frame, and the modified variable RecPicPointCount representing the number of points in the reconstructed point cloud frame.

To perform this process, the G-PCC coder may initialize RecPicPointCount to zero. The G-PCC coder may then concatenate points and attributes of a current slice with a reconstructed point cloud frame as follows:

```
for( pointIdx = 0; pointIdx <= gsh_num_points_minus1; pointIdx++,
RecPicPointCount++) {
    RecPic[ RecPicPointCount ][ 0] =
        PointPos[ pointIdx ][ 0 ] + slice_origin_x;
    RecPic[ RecPicPointCount ][ 1 ] =
        PointPos[ pointIdx ][ 1 ] + slice_origin_y;
    RecPic[ RecPicPointCount ][ 2 ] =
        PointPos[ pointIdx ][ 2 ] + slice_origin_z;
    for( axis = 0; axis < 3; axis++ ) {
        PointPos[ pointIdx ][ axis ] = ( PointPos[ pointIdx ][ axis ] *
            GlobalScale + 4 ) >> 3
    for( cIdx = 0; cIdx < NumAttributeComponents; cIdx++ )
        RecPic[ RecPicPointCount ][ 3 + cIdx ] = pointAttr[ pointIdx ][
        cIdx ];
}
```

In another example, a G-PCC coder (e.g., G-PCC encoder 200 or G-PCC decoder 300) may be configured to perform a normative scaling process on an entire point cloud frame. The G-PCC coder may perform a global scaling process before conformance output of the point cloud.

The G-PCC coder may code syntax elements of a sequence parameter set (SPS) to denote the scaling process.

An example of a modifies SPS is shown below, where "[added: "added text" ]" represents additions to the current G-PCC specification.

| | Descriptor |
|---|---|
| sequence_parameter_set( ) { | |
| ... | |
| [added: "global_scale_factor_log2 | ue(v)"] |
| [added: "global_scale_refinement_num_bits | ue(v) "] |
| [added: "if( global_scale_refinement_num_bits )"] | |
| [added: "global_scale_factor_refinement | u(v) "] |
| ... | |
| } | |

Semantics for the added syntax elements above may be defined as follows:

global_scale_factor_log 2 is used to derive the global scale factor to be applied to the positions of the point cloud. The value of global_scale_factor_log 2 shall be in the range of 0 to 31, inclusive.

global_scale_refinement_num_bits is used to specify the number bits used to specify the refinement of the global scale value. When global_scale_refinement_num_bits is equal to 0, no refinement is applied. The value of global_scale_refinement_num_bits shall be in the range of 0 to 31, inclusive.

global_scale_refinement_factor specifies the refinement to the global scale factor. When not present, the value of global_scale_refinement_factor is inferred to be equal to 0. The number of bits used to signal global_scale_refinement_factor is global_scale_refinement_num_bits.

In one alternative, global_scale_refinement_num_bits may be coded using a fixed length code, e.g., u(5).

In one alternative, the value of global_scale_factor_log 2+global_scale_refinement_num_bits may be constrained to be less than or equal to a certain value, e.g., 32.

In one alternative, the value of global_scale_refinement_num_bits may be less than or equal to global_scale_factor_log 2.

The G-PCC coder may derive the global scale value as follows:

GlobalScaleBase=1<<global_scale_refinement_num_bits
GlobalScaleShift=global_scale_refinement_num_bits
GlobalScaleOffset=GlobalScaleShift ? 1<<(GlobalScaleShift−1): 0
GlobalScale=(GlobalScaleBase+global_scale_refinement_factor)<<<global_scale_factor_log 2

The G-PCC coder may perform a slice concatenation process, generating outputs including a modified array RecPic with elements RecPic[pointIdx][attrIdx] representing points in the reconstructed point cloud frame, and a modified variable RecPicPointCount representing the number of points in the reconstructed point cloud frame. The G-PCC coder may initialize RecPicPointCount to a value of zero. The G-PCC coder may concatenate points and attributes of a current slice with a reconstructed point cloud frame as follows:

```
for (pointIdx = 0; pointIdx <= geom_num_points_minus1; pointIdx++,
RecPicPointCound++) {
    for (axis = 0; axis < 3; axis++)
        RecPic[RecPicPointCount][axis] = ((PointPos[pointIdx][axis] +
        SliceOriginStv[axis]) * GlobalScale + GlobalScaleOffset ) >>
        GlobalScaleShift;
    for (cIdx = 0; cIdx < NumAttributeComponents; cIdx++)
        RecPic[RecPicPointCount][3 + cIdx] =
        pointAttr[pointIdx][cIdx];
}
```

The example for signaling of the scale is just one example and may take other forms. That is, the techniques of this disclosure may be performed in conjunction with other forms of signaling the scale.

The current G-PCC specification does not have the notion of a normative bounding box. The SPS and the tile bounding boxes are specified after applying the non-normative scaling approaches. Associated with a tile, a slice may have a bounding box specified and the coded points are clipped to be within the slice bounding box. However, there are no restrictions that the slice bounding box should not exceed the tile boundary. In such cases, there is no notion of a box defined within the G-PCC codec that contains all the points in the point cloud.

Techniques for signal parameters associated with an additional bounding box in the SPS such that the points in the point cloud are contained within the additional bounding box are discussed in the following.

The parameters for such a bounding box may include one or more of a width, a height, or a depth.

The parameters may also include an offset for the origin of the bounding box (e.g., an x, y and z offset).

In some examples, a G-PCC encoder (e.g., G-PCC encoder 200) may signal a minimum and maximum values for x, y and z coordinates to specify the bounding box.

For instance, a G-PCC encoder (e.g., G-PCC encoder 200) may signal one or more of six parameters to specify a bounding box.

In some examples, a G-PCC decoder (e.g., G-PCC decoder 300) may derive the additional bounding boxes from the SPS bounding boxes signaled in the SPS.

In some examples, a G-PCC coder (e.g., G-PCC encoder 200 or G-PCC decoder 300) may be configured such that restrictions points in the point cloud are contained within the additional bounding box.

Similar additional bounding boxes may also be defined for tiles that specify boxes that should contain the point cloud data. For example, a G-PCC coder (e.g., G-PCC encoder 200 or G-PCC decoder 300) may define additional bounding boxes for tiles that specify boxes that should contain the point cloud data.

In some examples, a G-PCC coder (e.g., G-PCC encoder 200 or G-PCC decoder 300) may derive the additional bounding boxes from the tile bounding boxes.

A G-PCC coder (e.g., G-PCC encoder 200 or G-PCC decoder 300) may be configured to perform clipping operations at various coding processes such that the reconstructed/decoded points are contained within an additional bounding box. For example, the G-PCC coder may apply such clipping operations on the reconstructed point cloud, before the reconstructed point cloud is used for prediction by other points. The G-PCC coder may apply such clipping on the reconstructed point clouds after the slice decoding process. The G-PCC coder may apply such clipping on SPS bounding boxes, tile bounding boxes or other bounding boxes, and also on any respective additional bounding box.

In some examples, a G-PCC coder may code one or more parameters associated with an SPS bounding box without being conditioned on a presence flag. That is, the G-PCC coder may always code these parameters in the SPS. For example, the G-PCC coder may always code the SPS bounding box width, height and depth values, without any condition on the sps_bounding_box_present_flag. One or more parameters thus signalled (without presence flag) may be used to specify the normative bounding box.

In some examples, a G-PCC coder may code data specifying a normative bounding box dimensions for point cloud frames. The normative bounding box dimensions may be specified in the SPS or the GPS. The SPS already contains information describing the characteristics of the attributes. Therefore, it would be appropriate to include the characteristics (i.e., bounding box) of the geometry also in the same location (e.g., the SPS).

In some examples, the G-PCC coder may specify the origin of the normative box (which is assumed to be (0,0,0). For example, the G-PCC coder may code values specifying an x-, y-, and z-offset for the origin of the normative bounding box.

In some examples, the G-PCC coder may code data specifying the normative bounding box for the point cloud frame such that all the reconstructed points in the point cloud are constrained to be within the normative bounding box. The reconstructed point positions would be clipped to those bounding boxes. The slice origin may also be signalled with respect to the origin of this normative bounding box (in this proposal (0,0,0)).

The G-PCC coder may code an SPS including the following additional syntax elements relative to the existing SPS:

| | |
|---|---|
| point_cloud_frame_dim_num_bits_minus1 | ue(v) |
| point_cloud_frame_width | u(v) |
| point_cloud_frame_height | u(v) |
| point_cloud_frame_depth | u(v) |

Semantics for these additional syntax elements may be defined as follows: point_cloud_frame_dim_num_bits_minus1 plus 1 specifies the number of bits used to signal the syntax elements point_cloud_frame_width, point_cloud_frame_height and point_cloud_frame_depth. The value of point_cloud_frame_dim num bits_minus1 shall be in the range of 0 to 31, inclusive.
point_cloud_frame_width, point_cloud_frame_height, and point_cloud_frame_depth are used to specify the width, height and depth of the bounding box specified for the point cloud frames that refer to this GPS. The number of bits used to signal these syntax elements is equal to point_cloud_frame_dim_num_bits_minus1+1.

In some examples, the G-PCC coder may code data representing a scaled version of the point cloud frame width, depth, and height. The G-PCC coder may code syntax elements having values specifying the scale value used for one or more of width, depth, and/or height.

Furthermore, the G-PCC coder may clip reconstructed points in the slice concatenation process to the point cloud frame dimensions specified above. For example, the G-PCC coder may perform the following process:

```
for( pointIdx = 0; pointIdx <= gsh_num_points_minus1; pointIdx++,
RecPicPointCount++) {
    RecPic[ RecPicPointCount ][ 0 ] = Min( PointPos[ pointIdx ][ 0 ] +
    slice_origin_x, point_cloud_frame_width );
    RecPic[ RecPicPointCount ][ 1 ] = Min( PointPos[ pointIdx ][ 1 ] +
    slice_origin_y, point_cloud_frame_height );
    RecPic[ RecPicPointCount ][ 2 ] = Min( PointPos[ pointIdx ][ 2 ] +
    slice_origin_z, point_cloud_frame_depth );
    for( cIdx = 0; cIdx < NumAttributeComponents; cIdx++ )
        RecPic[ RecPicPointCount ][ 3 + cIdx ] =
        pointAttr[ pointIdx ][ cIdx ];
}
```

If the global normative scaling approach in the previous section is also used, the G-PCC coder may apply the scaling before clipping to the normative bounding.

In some examples, the G-PCC coder may apply the global normative scaling after clipping the reconstructed point positions to the normative bounding box.

In another example, the G-PCC coder may reuse the SPS bounding box to code data representing a normative bounding box. That is, the G-PCC coder may be configured to use the signaling of the SPS bounding box to code data representing the normative bounding box according to the following modifications to the SPS bounding box:

| | |
|---|---|
| ... | |
| sps_bounding_box_present_flag | u(1) |
| if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
| } | |
| sps_bounding_box_size_width | ue(v) |
| sps_bounding_box_size_height | ue(v) |
| sps_bounding_box_size_depth | ue(v) |
| ... | |

The G-PCC coder may use the values of sps_bounding_box_size_width, sps_bounding_box_size_height, and sps_bounding_box_size_depth to specify the normative bounding box. The G-PCC coder may use these values to clip the geometry position coordinates of the points accordingly.

Figure 5:
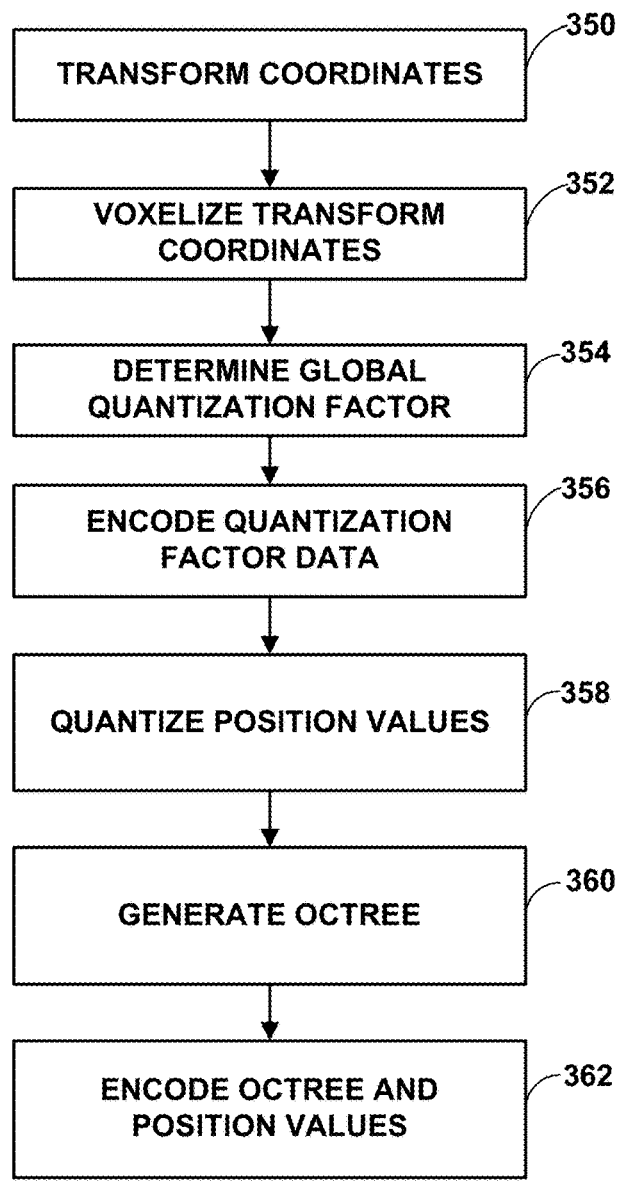
FIG. 5 is a flowchart illustrating an example method for encoding geometry-based point cloud data according to the techniques of this disclosure.

FIG. 5 is a flowchart illustrating an example method for encoding geometry-based point cloud data according to the techniques of this disclosure. The method of FIG. 5 is explained with respect to G-PCC encoder 200, but may be performed by other such devices.

Initially, G-PCC encoder 200 may receive a frame of point cloud data. G-PCC encoder 200 may apply a transform to coordinates of points in the point cloud data (350). The coordinates may also be referred to as position values, where each position value may include values for an x-, y-, and z-coordinate of a corresponding point. Transformation of the coordinates may result in data being expressed in a transform domain. G-PCC encoder 200 may then voxelize the transform coordinates (352).

G-PCC encoder 200 may further, according to the techniques of this disclosure, determine a global quantization (scaling) factor (354). The global quantization (scaling) factor may generally indicate an amount of quantization applied to the position values to generate quantized position values. The global quantization (scaling) factor may be expressed as a combination (e.g., concatenation) of a power of two value and a refinement value, as discussed above. G-PCC encoder 200 may further encode the quantization factor data (356), e.g., the exponent for the power of two value and the refinement value. The refinement value may be expressed in a certain number of bits, and G-PCC encoder 200 may also encode the value of the number of bits for the refinement value. As noted above, for example, G-PCC encoder 200 may encode a value for global_scale_factor_log 2 as the exponent for the power of two value, a value for global_scale_refinement_num_bits as the number of bits for the refinement value, and a value for global_scale_factor_refinement as the refinement value (expressed using the number of bits indicated by global_scale_refinement_num_bits). G-PCC encoder 200 may also quantize the position values using the global quantization (scaling) factor (358).

G-PCC encoder 200 may then generate an octree using the quantized voxelized transform coefficients (360). G-PCC encoder 200 may then encode the octree and the position values (362).

Figure 6:
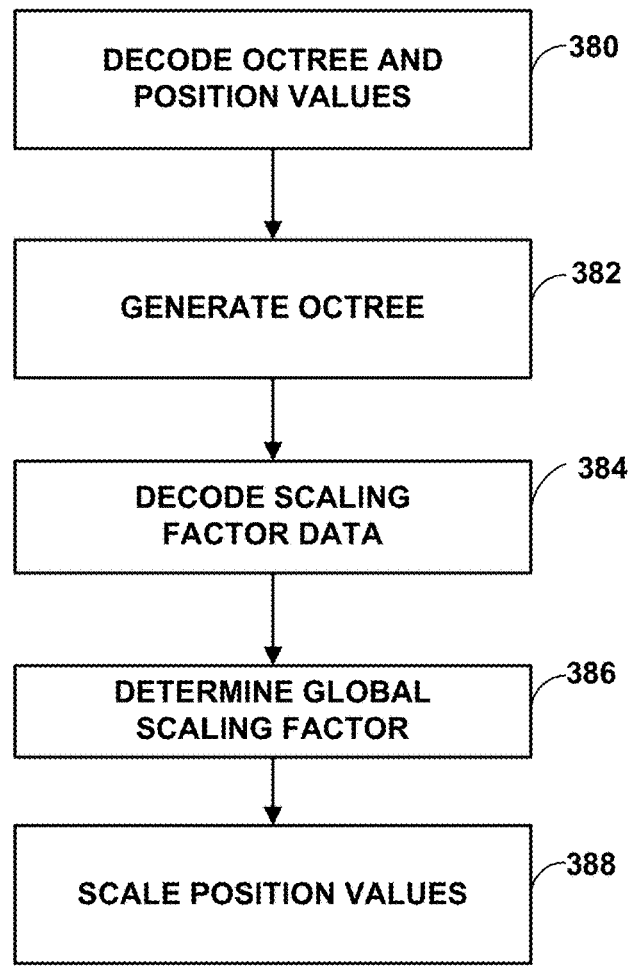
FIG. 6 is a flowchart illustrating an example method for decoding geometry-based point cloud data according to the techniques of this disclosure.

FIG. 6 is a flowchart illustrating an example method for decoding geometry-based point cloud data according to the techniques of this disclosure. The method of FIG. 6 is explained with respect to G-PCC decoder 300, but may be performed by other such devices.

Initially, G-PCC decoder 300 decodes data for an octree and position values for points within bounding boxes defined by the octree (380). G-PCC decoder 300 may then generate an octree using the octree data (382). The octree includes a root node and, for each node, either zero or eight child nodes, depending on whether the current node is partitioned into child nodes or not. Leaf nodes of the octree may correspond to bounding boxes enclosing one or more points of the geometry-based point cloud data.

G-PCC decoder 300 may also decode scaling factor data (384). For example, G-PCC decoder 300 may decode data representing a logarithmic value for a power of two portion of a global scaling factor, a number of bits for a refinement value, and the refinement value (represented using the number of bits).

G-PCC decoder 300 may then determine the global scaling factor from the decoded scaling factor data (386). For example, as noted above, the global scaling factor may be represented as a value including a power of two component and a refinement component, which are concatenated or added together. G-PCC decoder 300 may use the logarithmic value, e.g., N, to calculate the power of two component, e.g., $2^N$. G-PCC decoder 300 may then calculate the impact of a refinement value, R (having B bits), according to $$\left(\left(\frac{2^{N+1} - 2^N}{2^B}\right) * R\right).$$

G-PCC decoder 300 may then concatenate the power of two value with the refinement value to determine the global scaling factor.

Ultimately, G-PCC decoder 300 may then scale the position values for the points of the point cloud data (388) using the global scaling factor. In some examples, if the scaling of position values for a given point results in the point exceeding a corresponding bounding box, G-PCC decoder 300 may clip the scaled position values such that the position of the point does not exceed the boundaries of the corresponding bounding box.

In this manner, the method of FIG. 6 represents an example of a method of decoding geometry-based point cloud data, the method including decoding a frame of geometry-based point cloud data including a plurality of points, each of the points being associated with position values defining a respective position of the point; determining a global scaling factor for the frame; and scaling the position values of each of the points by the global scaling factor.

Examples in the various aspects of this disclosure may be used individually or in any combination.

The following clauses summarize certain techniques of this disclosure.

Clause 1: A method comprising: determining a scaling factor of a point cloud using a non-normative scaling syntax element; applying the scaling factor to the point cloud to generate a scaled point cloud; determining whether the scaled point cloud is in violation of an SPS boundary box constraint; and coding the scaled point cloud in response to determining that the scaled point cloud is not in violation of the SPS boundary box constraint.

Clause 2: A method comprising: determining that normative scaling is enabled based on a syntax element for a point cloud compression; determining a global scaling factor of a point cloud using a normative scaling syntax element; applying the global factor to the point cloud to generate a global scaled point cloud; and coding the global scaled point cloud.

Clause 3: A method comprising: determining a scale power value based on a syntax element for a point cloud compression or one or more QP values; determining a scaling factor of a point cloud using the scale power value and a QP value; applying the scaling factor to the point cloud to generate a scaled point cloud; and coding the scaled point cloud.

Clause 4: A method comprising: determining a bounding box within a SPS boundary box based on a syntax element for a point cloud compression; determining a point cloud for the point cloud compression, wherein determining the point cloud comprises determining the point cloud to be within the boundary box; and coding the point cloud.

Clause 5: A method comprising the method of any of clauses 1-4, further comprising performing a clipping operation to clip a reconstructed point cloud.

Clause 6: A method comprising coding a parameter set including a bounding box syntax structure.

Clause 7: The method of any of clauses 1-6, further comprising: determining one or more quantization or scaling parameters for respective components of a point cloud; and quantizing or scaling the components using the respective quantization or scaling parameters.

Clause 8: The method of clause 7, wherein determining comprises coding data representing the quantization or scaling parameters.

Clause 9: The method of clause 7, wherein determining comprises inferring the quantization or scaling parameters.

Clause 10: A device for processing a point cloud, the device comprising one or more means for performing the method of any of clauses 1-9.

Clause 11: The device of clause 10, wherein the one or more means comprise one or more processors implemented in circuitry.

Clause 12: The device of any of clauses 10 or 11, further comprising a memory to store the data representing the point cloud.

Clause 13: The device of any of clauses 10-12, wherein the device comprises a decoder.

Clause 14: The device of any of clauses 10-13, wherein the device comprises an encoder.

Clause 15: The device of any of clauses 10-14, further comprising a device to generate the point cloud.

Clause 16: The device of any of clauses 10-15, further comprising a display to present imagery based on the point cloud.

Clause 17: A computer-readable storage medium having stored thereon instructions that, when executed, cause one or more processors to perform the method of any of clauses 1-9.

Clause 18: A method of decoding geometry-based point cloud data, the method comprising: decoding a frame of geometry-based point cloud data including a plurality of points, each of the points being associated with position values defining a respective position of the point; determining a global scaling factor for the frame; and scaling the position values of each of the points by the global scaling factor.

Clause 19: The method of clause 18, wherein prior to scaling, the position values are expressed using a first bit depth, and wherein after scaling, the scaled position values are expressed using a second bit depth higher than the first bit depth.

Clause 20: The method of clause 19, further comprising decoding data representative of the second bit depth.

Clause 21: The method of any of clauses 19 and 20, wherein determining the global scaling factor comprises decoding data representative of a number of bits used to specify a refinement value to be applied to an initial global scaling factor.

Clause 22: The method of clause 21, further comprising decoding a scale factor refinement value having the number of bits.

Clause 23: The method of clause 22, wherein determining the global scaling factor comprises: decoding data representing the initial global scaling factor; determining a global scale base value according to 1<<the number of bits used to specify the refinement value, wherein '<<' represents a bitwise left shift operator; determining a global scale shift value according to 1<<the number of bits used to specify the refinement value; determining a global scale offset value according to: when the global scale shift value is greater than zero, 1<<the global scale shift value minus 1; or when the global scale shift value is equal to zero, the global scale offset value being equal to zero; and calculating the global scaling factor according to (the global scale base value plus the global scale refinement value)<<the initial global scaling factor.

Clause 24: The method of any of clauses 18-23, further comprising partitioning the frame into one or more bounding boxes, at least one of the bounding boxes including a subset of the points, wherein scaling the position values of the subset of the points comprises: determining that scaling of one of the position values for one of the subset of the points would cause the one of the position values to exceed the at least one of the bounding boxes; and clipping the one of the position values for the one of the subset of the points to prevent the one of the position values from exceeding the at least one of the bounding boxes.

Clause 25: The method of any of clauses 18-24, further comprising encoding the frame prior to decoding the frame.

Clause 26: A device for decoding geometry-based point cloud data, the device comprising: a memory configured to store geometry-based point cloud data; and one or more processors implemented in circuitry and configured to: decode a frame of the geometry-based point cloud data including a plurality of points, each of the points being associated with position values defining a respective position of the point; determine a global scaling factor for the frame; and scale the position values of each of the points by the global scaling factor.

Clause 27: The device of clause 26, wherein prior to scaling, the position values are expressed using a first bit depth, and wherein after scaling, the scaled position values are expressed using a second bit depth higher than the first bit depth.

Clause 28: The device of clause 27, wherein the one or more processors are further configured to decode data representative of the second bit depth.

Clause 29: The device of any of clauses 27 and 28, wherein to determine the global scaling factor, the one or more processors are configured to decode data representative of a number of bits used to specify a refinement value to be applied to an initial global scaling factor.

Clause 30: The device of clause 29, wherein the one or more processors are further configured to decode a scale factor refinement value having the number of bits.

Clause 31: The device of clause 30, wherein to determine the global scaling factor, the one or more processors are configured to: decode data representing the initial global scaling factor; determine a global scale base value according to 1<<the number of bits used to specify the refinement value, wherein '<<' represents a bitwise left shift operator; determine a global scale shift value according to 1<<the number of bits used to specify the refinement value; determine a global scale offset value according to: when the global scale shift value is greater than zero, 1<<the global scale shift value minus 1; or when the global scale shift value is equal to zero, the global scale offset value being equal to zero; and calculate the global scaling factor according to (the global scale base value plus the global scale refinement value)<<the initial global scaling factor.

Clause 32: The device of any of clauses 26-31, wherein the one or more processors are further configured to partition the frame into one or more bounding boxes, at least one of the bounding boxes including a subset of the points, and wherein to scale the position values of the subset of the points, the one or more processors are configured to: determine that scaling of one of the position values for one of the subset of the points would cause the one of the position values to exceed the at least one of the bounding boxes; and clip the one of the position values for the one of the subset of the points to prevent the one of the position values from exceeding the at least one of the bounding boxes.

Clause 33: The device of any of clauses 26-32, wherein the one or more processors are further configured to encode the frame prior to decoding the frame.

Clause 34: The device of any of clauses 26-33, further comprising a display configured to display the decoded geometry-based point cloud data.

Clause 35: The device of any of clauses 26-34, wherein the device comprises one or more of a camera, a computer, a mobile device, a broadcast receiver device, or a set-top box.

Clause 36: A computer-readable storage medium having stored thereon instructions that, when executed, cause a processor to: decode a frame of geometry-based point cloud data including a plurality of points, each of the points being associated with position values defining a respective position of the point; determine a global scaling factor for the frame; and scale the position values of each of the points by the global scaling factor.

Clause 37: The computer-readable storage medium of clause 36, wherein prior to scaling, the position values are expressed using a first bit depth, and wherein after scaling, the scaled position values are expressed using a second bit depth higher than the first bit depth.

Clause 38: The computer-readable storage medium of clause 37, further comprising instructions that cause the processor to decode data representative of the second bit depth.

Clause 39: The computer-readable storage medium of any of clauses 37 and 38, wherein the instructions that cause the processor to determine the global scaling factor comprise instructions that cause the processor to decode data representative of a number of bits used to specify a refinement value to be applied to an initial global scaling factor.

Clause 40: The computer-readable storage medium of clause 39, further comprising instructions that cause the processor to decode a scale factor refinement value having the number of bits.

Clause 41: The computer-readable storage medium 40, wherein the instructions that cause the processor to determine the global scaling factor comprise instructions that cause the processor to: decode data representing the initial global scaling factor; determine a global scale base value according to 1<<the number of bits used to specify the refinement value, wherein '<<' represents a bitwise left shift operator; determine a global scale shift value according to 1<<the number of bits used to specify the refinement value; determine a global scale offset value according to: when the global scale shift value is greater than zero, 1<<the global scale shift value minus 1; or when the global scale shift value is equal to zero, the global scale offset value being equal to zero; and calculate the global scaling factor according to (the global scale base value plus the global scale refinement value)<<the initial global scaling factor.

Clause 42: The computer-readable storage medium of any of clauses 36-41, further comprising instructions that cause the processor to partition the frame into one or more bounding boxes, at least one of the bounding boxes including a subset of the points, wherein scaling the position values of the subset of the points comprises: determine that scaling of one of the position values for one of the subset of the points would cause the one of the position values to exceed the at least one of the bounding boxes; and clip the one of the position values for the one of the subset of the points to prevent the one of the position values from exceeding the at least one of the bounding boxes.

Clause 43: The computer-readable storage medium of any of clauses 36-42, further comprising instructions that cause the processor to encode the frame prior to decoding the frame.

Clause 44: A device for decoding geometry-based point cloud data, the device comprising: means for decoding a frame of geometry-based point cloud data including a plurality of points, each of the points being associated with position values defining a respective position of the point; determining a global scaling factor for the frame; and scaling the position values of each of the points by the global scaling factor.

Clause 45: The device of clause 44, wherein prior to scaling, the position values are expressed using a first bit depth, and wherein after scaling, the scaled position values are expressed using a second bit depth higher than the first bit depth.

Clause 46: The device of clause 45, further comprising means for decoding data representative of the second bit depth.

Clause 47: The device of any of clauses 45 and 46, wherein the means for determining the global scaling factor comprises means for decoding data representative of a number of bits used to specify a refinement value to be applied to an initial global scaling factor.

Clause 48: The device of clause 47, further comprising means for decoding a scale factor refinement value having the number of bits.

Clause 49: The device of clause 48, wherein the means for determining the global scaling factor comprises: means for decoding data representing the initial global scaling factor; means for determining a global scale base value according to 1<<the number of bits used to specify the refinement value, wherein '<<' represents a bitwise left shift operator; means for determining a global scale shift value according to 1<<the number of bits used to specify the refinement value; means for determining a global scale offset value according to: when the global scale shift value is greater than zero, 1<<the global scale shift value minus 1; or when the global scale shift value is equal to zero, the global scale offset value being equal to zero; and means for calculating the global scaling factor according to (the global scale base value plus the global scale refinement value)<<the initial global scaling factor.

Clause 50: The device of any of clauses 44-49, further comprising means for partitioning the frame into one or more bounding boxes, at least one of the bounding boxes including a subset of the points, wherein the means for scaling the position values of the subset of the points comprises: means for determining that scaling of one of the position values for one of the subset of the points would cause the one of the position values to exceed the at least one of the bounding boxes; and means for clipping the one of the position values for the one of the subset of the points to prevent the one of the position values from exceeding the at least one of the bounding boxes.

Clause 51: The device of any of clauses 44-50, further comprising means for encoding the frame prior to decoding the frame.

Clause 52: A method of decoding geometry-based point cloud data, the method comprising: decoding a frame of geometry-based point cloud data including a plurality of points, each of the points being associated with position values defining a respective position of the point; determining a global scaling factor for the frame; and scaling the position values of each of the points by the global scaling factor.

Clause 53: The method of clause 52, wherein prior to scaling, the position values are expressed using a first bit depth, and wherein after scaling, the scaled position values are expressed using a second bit depth higher than the first bit depth.

Clause 54: The method of clause 53, further comprising decoding data representative of the second bit depth.

Clause 55: The method of clause 53, wherein determining the global scaling factor comprises decoding data representative of a number of bits used to specify a refinement value to be applied to an initial global scaling factor.

Clause 56: The method of clause 55, further comprising decoding a scale factor refinement value having the number of bits.

Clause 57: The method of clause 56, wherein determining the global scaling factor comprises: decoding data representing the initial global scaling factor; determining a global scale base value according to 1<<the number of bits used to specify the refinement value, wherein '<<' represents a bitwise left shift operator; determining a global scale shift value according to 1<<the number of bits used to specify the refinement value; determining a global scale offset value according to: when the global scale shift value is greater than zero, 1<<the global scale shift value minus 1; or when the global scale shift value is equal to zero, the global scale offset value being equal to zero; and calculating the global scaling factor according to (the global scale base value plus the global scale refinement value)<<the initial global scaling factor.

Clause 58: The method of clause 52, further comprising partitioning the frame into one or more bounding boxes, at least one of the bounding boxes including a subset of the points, wherein scaling the position values of the subset of the points comprises: determining that scaling of one of the position values for one of the subset of the points would cause the one of the position values to exceed the at least one of the bounding boxes; and clipping the one of the position values for the one of the subset of the points to prevent the one of the position values from exceeding the at least one of the bounding boxes.

Clause 59: The method of clause 52, further comprising encoding the frame prior to decoding the frame.

Clause 60: A device for decoding geometry-based point cloud data, the device comprising: a memory configured to store geometry-based point cloud data; and one or more processors implemented in circuitry and configured to: decode a frame of the geometry-based point cloud data including a plurality of points, each of the points being associated with position values defining a respective position of the point; determine a global scaling factor for the frame; and scale the position values of each of the points by the global scaling factor.

Clause 61: The device of clause 60, wherein prior to scaling, the position values are expressed using a first bit depth, and wherein after scaling, the scaled position values are expressed using a second bit depth higher than the first bit depth.

Clause 62: The device of clause 61, wherein the one or more processors are further configured to decode data representative of the second bit depth.

Clause 63: The device of clause 61, wherein to determine the global scaling factor, the one or more processors are configured to decode data representative of a number of bits used to specify a refinement value to be applied to an initial global scaling factor.

Clause 64: The device of clause 63, wherein the one or more processors are further configured to decode a scale factor refinement value having the number of bits.

Clause 65: The device of clause 64, wherein to determine the global scaling factor, the one or more processors are configured to: decode data representing the initial global scaling factor; determine a global scale base value according to 1<<the number of bits used to specify the refinement value, wherein '<<' represents a bitwise left shift operator; determine a global scale shift value according to 1<<the number of bits used to specify the refinement value; determine a global scale offset value according to: when the global scale shift value is greater than zero, 1<<the global scale shift value minus 1; or when the global scale shift value is equal to zero, the global scale offset value being equal to zero; and calculate the global scaling factor according to (the global scale base value plus the global scale refinement value)<<the initial global scaling factor.

Clause 66: The device of clause 60, wherein the one or more processors are further configured to partition the frame into one or more bounding boxes, at least one of the bounding boxes including a subset of the points, and wherein to scale the position values of the subset of the points, the one or more processors are configured to: determine that scaling of one of the position values for one of the subset of the points would cause the one of the position values to exceed the at least one of the bounding boxes; and clip the one of the position values for the one of the subset of the points to prevent the one of the position values from exceeding the at least one of the bounding boxes.

Clause 67: The device of clause 60, wherein the one or more processors are further configured to encode the frame prior to decoding the frame.

Clause 68: The device of clause 60, further comprising a display configured to display the decoded geometry-based point cloud data.

Clause 69: The device of clause 60, wherein the device comprises one or more of a vehicle, a camera, a computer, a mobile device, a broadcast receiver device, or a set-top box.

Clause 70: A computer-readable storage medium having stored thereon instructions that, when executed, cause a processor to: decode a frame of geometry-based point cloud data including a plurality of points, each of the points being associated with position values defining a respective position of the point; determine a global scaling factor for the frame; and scale the position values of each of the points by the global scaling factor.

Clause 71: The computer-readable storage medium of clause 70, wherein prior to scaling, the position values are expressed using a first bit depth, and wherein after scaling, the scaled position values are expressed using a second bit depth higher than the first bit depth.

Clause 72: The computer-readable storage medium of clause 71, further comprising instructions that cause the processor to decode data representative of the second bit depth.

Clause 73: The computer-readable storage medium of clause 71, wherein the instructions that cause the processor to determine the global scaling factor comprise instructions that cause the processor to decode data representative of a number of bits used to specify a refinement value to be applied to an initial global scaling factor.

Clause 74: The computer-readable storage medium of clause 73, further comprising instructions that cause the processor to decode a scale factor refinement value having the number of bits.

Clause 75: The computer-readable storage medium 74, wherein the instructions that cause the processor to determine the global scaling factor comprise instructions that cause the processor to: decode data representing the initial global scaling factor; determine a global scale base value according to 1<<the number of bits used to specify the refinement value, wherein '<<' represents a bitwise left shift operator; determine a global scale shift value according to 1<<the number of bits used to specify the refinement value; determine a global scale offset value according to: when the global scale shift value is greater than zero, 1<<the global scale shift value minus 1; or when the global scale shift value is equal to zero, the global scale offset value being equal to zero; and calculate the global scaling factor according to (the global scale base value plus the global scale refinement value)<<the initial global scaling factor.

Clause 76: The computer-readable storage medium of clause 70, further comprising instructions that cause the processor to partition the frame into one or more bounding boxes, at least one of the bounding boxes including a subset of the points, wherein scaling the position values of the subset of the points comprises: determine that scaling of one of the position values for one of the subset of the points would cause the one of the position values to exceed the at least one of the bounding boxes; and clip the one of the position values for the one of the subset of the points to prevent the one of the position values from exceeding the at least one of the bounding boxes.

Clause 77: The computer-readable storage medium of clause 70, further comprising instructions that cause the processor to encode the frame prior to decoding the frame.

Clause 78: A device for decoding geometry-based point cloud data, the device comprising: means for decoding a frame of geometry-based point cloud data including a plurality of points, each of the points being associated with position values defining a respective position of the point;

determining a global scaling factor for the frame; and scaling the position values of each of the points by the global scaling factor.

Clause 79: The device of clause 78, wherein prior to scaling, the position values are expressed using a first bit depth, and wherein after scaling, the scaled position values are expressed using a second bit depth higher than the first bit depth.

Clause 80: The device of clause 79, further comprising means for decoding data representative of the second bit depth.

Clause 81: The device of clause 79, wherein the means for determining the global scaling factor comprises means for decoding data representative of a number of bits used to specify a refinement value to be applied to an initial global scaling factor.

Clause 82: The device of clause 81, further comprising means for decoding a scale factor refinement value having the number of bits.

Clause 83: The device of clause 82, wherein the means for determining the global scaling factor comprises: means for decoding data representing the initial global scaling factor; means for determining a global scale base value according to 1<<the number of bits used to specify the refinement value, wherein '<<' represents a bitwise left shift operator; means for determining a global scale shift value according to 1<<the number of bits used to specify the refinement value; means for determining a global scale offset value according to: when the global scale shift value is greater than zero, 1<<the global scale shift value minus 1; or when the global scale shift value is equal to zero, the global scale offset value being equal to zero; and means for calculating the global scaling factor according to (the global scale base value plus the global scale refinement value)<<the initial global scaling factor.

Clause 84: The device of clause 78, further comprising means for partitioning the frame into one or more bounding boxes, at least one of the bounding boxes including a subset of the points, wherein the means for scaling the position values of the subset of the points comprises: means for determining that scaling of one of the position values for one of the subset of the points would cause the one of the position values to exceed the at least one of the bounding boxes; and means for clipping the one of the position values for the one of the subset of the points to prevent the one of the position values from exceeding the at least one of the bounding boxes.

Clause 85: The device of clause 78, further comprising means for encoding the frame prior to decoding the frame.

Clause 86: A method of encoding point cloud data, the method comprising: encoding a frame of point cloud data including a plurality of points, each of the points being associated with position values defining a respective position of the point; determining an initial global scaling factor for the frame; determining a number of bits used to specify a refinement value to be applied to the initial global scaling factor; determining a scale factor refinement value having the number of bits; and generating a bitstream including data representing the encoded frame, the number of bits used to specify the refinement value, and the scale factor refinement value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding point cloud data, the method comprising:
    decoding a frame of point cloud data including a plurality of points, each of the points being associated with position values defining a respective position of the point;
    decoding a sequence parameter set (SPS) for the frame of point cloud data, including:
        decoding an initial global scale value from the SPS;
        decoding data from the SPS representing a number of bits for a scale factor refinement value; and
        decoding the scale factor refinement value from the SPS, the scale factor refinement value having the number of bits;
    determining a global scaling factor for the frame using the initial scale value, the value representing the number of bits for the scale factor refinement value, and the scale factor refinement value, the global scaling factor including an integer component and a non-integer component; and
    scaling the position values of each of the points by the global scaling factor.

2. The method of claim 1, wherein prior to scaling, the position values are expressed using a first bit depth, and wherein after scaling, the scaled position values are expressed using a second bit depth different than the first bit depth.

3. The method of claim 2, further comprising decoding data representative of the second bit depth.

4. The method of claim 2, wherein the second bit depth is higher than the first bit depth.

5. The method of claim 2, wherein the second bit depth represents integer precision and the first bit depth represents fractional precision.

6. The method of claim 1, wherein determining the global scaling factor comprises:
    determining a global scale base value according to 1<<the number of bits used to specify the scale factor refinement value, wherein '<<' represents a bitwise left shift operator;
    determining a global scale shift value according to the number of bits used to specify the scale factor refinement value;
    determining a global scale offset value according to:
        when the global scale shift value is greater than zero, 1<<the global scale shift value minus 1; or
        when the global scale shift value is equal to zero, the global scale offset value being equal to zero; and
    calculating the global scaling factor according to (the global scale base value plus the scale factor refinement value)<<the initial global scale value.

7. The method of claim 1, further comprising partitioning the frame into one or more bounding boxes, at least one of the bounding boxes including a subset of the points, wherein scaling the position values of the subset of the points comprises:
    determining that scaling of one of the position values for one of the subset of the points would cause the one of the position values to exceed the at least one of the bounding boxes; and
    clipping the one of the position values for the one of the subset of the points to prevent the one of the position values from exceeding the at least one of the bounding boxes.

8. The method of claim 1, further comprising partitioning the frame into two or more bounding boxes, at least one of the bounding boxes including a subset of the points, wherein scaling the position values of the subset of the points comprises:
    determining that scaling of one of the position values for one of the subset of the points would cause the one of the position values to exceed the at least one of the bounding boxes; and
    constraining the one of the position values to be within the at least one of the bounding boxes.

9. The method of claim 1, further comprising encoding the frame prior to decoding the frame.

10. A device for decoding point cloud data, the device comprising:
    a memory configured to store point cloud data; and
    a processing system comprising one or more processors implemented in circuitry, the processing system being configured to:
        decode a frame of the point cloud data including a plurality of points, each of the points being associated with position values defining a respective position of the point;
        decode a sequence parameter set (SPS) for the frame of point cloud data, wherein to decode the SPS, the processing system is configured to:
            decode an initial global scale value from the SPS;
            decode data from the SPS representing a number of bits for a scale factor refinement value; and
            decode the scale factor refinement value from the SPS, the scale factor refinement value having the number of bits;
        determine a global scaling factor for the frame using the initial scale value, the value representing the number of bits for the scale factor refinement value, and the scale factor refinement value, the global scaling factor including an integer component and a non-integer component; and
        scale the position values of each of the points by the global scaling factor.

11. The device of claim 10, wherein prior to scaling, the position values are expressed using a first bit depth, and wherein after scaling, the scaled position values are expressed using a second bit depth different than the first bit depth.

12. The device of claim 11, wherein the processing system is further configured to decode data representative of the second bit depth.

13. The device of claim 10, wherein to determine the global scaling factor, the processing system is configured to:
    determine a global scale base value according to 1<<the number of bits used to specify the scale factor refinement value, wherein '<<' represents a bitwise left shift operator;
    determine a global scale shift value according to the number of bits used to specify the scale factor refinement value;

determine a global scale offset value according to:
  when the global scale shift value is greater than zero, 1<<the global scale shift value minus 1; or
  when the global scale shift value is equal to zero, the global scale offset value being equal to zero; and
calculate the global scaling factor according to (the global scale base value plus the scale factor refinement value) <<the initial global scale value.

14. The device of claim 10, wherein the processing system is further configured to partition the frame into one or more bounding boxes, at least one of the bounding boxes including a subset of the points, and wherein to scale the position values of the subset of the points, the processing system is configured to:
  determine that scaling of one of the position values for one of the subset of the points would cause the one of the position values to exceed the at least one of the bounding boxes; and
  clip the one of the position values for the one of the subset of the points to prevent the one of the position values from exceeding the at least one of the bounding boxes.

15. The device of claim 10, wherein the processing system is further configured to encode the frame prior to decoding the frame.

16. The device of claim 10, further comprising a display configured to display the decoded point cloud data.

17. The device of claim 10, wherein the device comprises one or more of a vehicle, a camera, a computer, a mobile device, a broadcast receiver device, or a set-top box.

18. A non-transitory computer-readable storage medium having stored thereon instructions that, when executed, cause a processor to:
  decode a frame of point cloud data including a plurality of points, each of the points being associated with position values defining a respective position of the point;
  decode a sequence parameter set (SPS) for the frame of point cloud data, wherein the instructions that cause the processor to decode the SPS comprise instructions that cause the processor to:
    decode an initial global scale value from the SPS;
    decode data from the SPS representing a number of bits for a scale factor refinement value; and
    decode the scale factor refinement value from the SPS, the scale factor refinement value having the number of bits;
  determine a global scaling factor for the frame using the initial scale value, the value representing the number of bits for the scale factor refinement value, and the scale factor refinement value, the global scaling factor including an integer component and a non-integer component; and
  scale the position values of each of the points by the global scaling factor.

19. A device for decoding point cloud data, the device comprising:
  means for decoding a frame of point cloud data including a plurality of points, each of the points being associated with position values defining a respective position of the point;
  means for decoding a sequence parameter set (SPS) for the frame of point cloud data, including:
    means for decoding an initial global scale value from the SPS;
    means for decoding data from the SPS representing a number of bits for a scale factor refinement value; and
    means for decoding the scale factor refinement value from the SPS, the scale factor refinement value having the number of bits;
  means for determining a global scaling factor for the frame using the initial scale value, the value representing the number of bits for the scale factor refinement value, and the scale factor refinement value, the global scaling factor including an integer component and a non-integer component; and
  means for scaling the position values of each of the points by the global scaling factor.

20. A method of encoding point cloud data, the method comprising:
  downscaling a frame of point cloud data including a plurality of points using a global scaling factor, the global scaling factor including an integer component and a non-integer component, to form a downscaled frame of point cloud data, each of the points being associated with position values defining a respective position of the point;
  determining an initial global scaling factor for the frame for the global scaling factor;
  determining a number of bits for a scale factor refinement value;
  determining the scale factor refinement value for the global scaling factor, the scale factor refinement value having the number of bits;
  encoding a sequence parameter set (SPS) for the frame of point cloud data, the SPS including the initial global scaling factor, the data representing the number of bits, and the scale factor refinement value;
  encoding the downscaled frame; and
  generating a bitstream including data representing the encoded downscaled frame and the SPS including the initial global scaling factor, the number of bits for the scale refinement value, and the scale factor refinement value.

* * * * *